(12) United States Patent
Peiffer et al.

(10) Patent No.: US 8,715,545 B2
(45) Date of Patent: May 6, 2014

(54) SYSTEMS AND METHODS FOR FORMING HIGH PERFORMANCE COMPRESSIBLE OBJECTS

(75) Inventors: Dennis G. Peiffer, Annandale, NJ (US); Barbara Carstensen, Annandale, NJ (US); Richard S. Polizzotti, Milford, NJ (US); Arnold Lustiger, Edison, NJ (US); David C. Dalrymple, Bloomsbury, NJ (US); Walter T. Matuszek, Easton, PA (US)

(73) Assignee: ExxonMobil Upstream Research Company, Houston, TX (US)

( * ) Notice: Subject to any disclaimer, the term of this patent is extended or adjusted under 35 U.S.C. 154(b) by 114 days.

(21) Appl. No.: 13/500,553

(22) PCT Filed: Sep. 3, 2010

(86) PCT No.: PCT/US2010/047803
§ 371 (c)(1),
(2), (4) Date: Apr. 5, 2012

(87) PCT Pub. No.: WO2011/066024
PCT Pub. Date: Jun. 3, 2011

(65) Prior Publication Data
US 2012/0223450 A1    Sep. 6, 2012

Related U.S. Application Data

(60) Provisional application No. 61/265,222, filed on Nov. 30, 2009.

(51) Int. Cl.
*B29B 9/00* (2006.01)

(52) U.S. Cl.
USPC ............ 264/5; 264/4.3; 264/4.6; 264/7

(58) Field of Classification Search
None
See application file for complete search history.

(56) References Cited

U.S. PATENT DOCUMENTS

| | | |
|---|---|---|
| 3,174,561 A | 3/1965 | Sterrett |
| 3,179,631 A | 4/1965 | Endrey |
| 3,179,633 A | 4/1965 | Endrey |
| 3,231,030 A | 1/1966 | Blom |
| 3,625,873 A | 12/1971 | Wilson |
| 4,099,583 A | 7/1978 | Maus |
| 4,133,854 A | 1/1979 | Hendricks |
| 4,407,980 A | 10/1983 | Gagliani et al. |
| 4,421,656 A | 12/1983 | Donatelli et al. |
| 4,425,441 A | 1/1984 | Gagliani et al. |
| 4,433,068 A | 2/1984 | Long et al. |
| 4,603,193 A | 7/1986 | Richardson et al. |

(Continued)

OTHER PUBLICATIONS

English translation of Abstract of CN 1010089030, published Jun. 18, 2007, provided by IP.com, Inc., 1 page.

(Continued)

*Primary Examiner* — Mary F Theisen
(74) *Attorney, Agent, or Firm* — ExxonMobil Upstream Research Company—Law Department

(57) ABSTRACT

The present systems and methods utilize a polyamic acid solution as a precursor to form a polyimide bead having desired properties. The polyamic acid solution may be formed into a polyamic acid droplet. The polyamic acid droplet is then processed to form a polyamic acid bead, such as by extraction of solvent to concentrate the polyamic acid or by partial chemical imidization of the polyamic acid. The polyamic acid bead is then better able to retain its shape during subsequent processing steps, such as drying and pressurizing, before final thermal imidization.

5 Claims, 13 Drawing Sheets

(56) References Cited

U.S. PATENT DOCUMENTS

| | | |
|---|---|---|
| 4,681,654 A | 7/1987 | Clementi et al. |
| 4,830,640 A | 5/1989 | Nakamura et al. |
| 5,126,381 A | 6/1992 | Liscomb |
| 5,141,642 A | 8/1992 | Kusuki et al. |
| 5,308,569 A | 5/1994 | Hamamoto et al. |
| 5,356,374 A | 10/1994 | Hogan et al. |
| 5,708,128 A | 1/1998 | Oikawa et al. |
| 5,881,826 A | 3/1999 | Brookey |
| 5,910,467 A | 6/1999 | Bragg |
| 5,994,418 A | 11/1999 | Weiser et al. |
| 6,020,388 A | 2/2000 | Straub, Jr. et al. |
| 6,084,000 A | 7/2000 | Weiser et al. |
| 6,156,708 A | 12/2000 | Brookey et al. |
| 6,180,746 B1 | 1/2001 | Weiser et al. |
| 6,235,803 B1 | 5/2001 | Weiser et al. |
| 6,335,418 B1 | 1/2002 | Asao et al. |
| 6,395,853 B1 | 5/2002 | Oswald et al. |
| 6,422,326 B1 | 7/2002 | Brookey et al. |
| 6,451,953 B1 | 9/2002 | Albright |
| 6,497,289 B1 | 12/2002 | Cook et al. |
| 6,530,437 B2 | 3/2003 | Maurer et al. |
| 6,588,501 B1 | 7/2003 | Boyadjieff |
| 6,610,798 B1 | 8/2003 | Bleijenberg et al. |
| 6,689,465 B1 | 2/2004 | Omori et al. |
| 6,747,107 B2 | 6/2004 | Petela et al. |
| 6,800,668 B1 | 10/2004 | Odidi et al. |
| 6,852,828 B2 | 2/2005 | Scott |
| 6,906,009 B2 | 6/2005 | Shinbach et al. |
| 7,019,103 B2 | 3/2006 | Yokota et al. |
| 7,108,066 B2 | 9/2006 | Jamison |
| 7,178,590 B2 | 2/2007 | Vargo, Jr. et al. |
| 7,208,106 B2 | 4/2007 | Shekunov et al. |
| 7,264,051 B2 | 9/2007 | Nguyen et al. |
| 7,300,972 B2 | 11/2007 | Ozawa et al. |
| 7,303,609 B2 | 12/2007 | Chung et al. |
| 7,334,636 B2 | 2/2008 | Nguyen |
| 7,361,693 B2 | 4/2008 | Albright et al. |
| 7,482,309 B2 | 1/2009 | Ravi et al. |
| 7,494,711 B2 | 2/2009 | Kaufman et al. |
| 7,543,642 B2 | 6/2009 | Reddy et al. |
| 7,556,677 B2 | 7/2009 | Cranford et al. |
| 7,677,332 B2 | 3/2010 | Spiecker et al. |
| 7,972,555 B2 | 7/2011 | Polizzotti et al. |
| 7,980,329 B2 | 7/2011 | Spiecker et al. |
| 8,076,269 B2 | 12/2011 | Polizzotti et al. |
| 8,088,716 B2 | 1/2012 | Polizzotti et al. |
| 8,088,717 B2 | 1/2012 | Polizzotti et al. |
| 2005/0124499 A1 | 6/2005 | Shinbach et al. |
| 2006/0113110 A1 | 6/2006 | Leuchtenberg |
| 2006/0254775 A1 | 11/2006 | Jamison |
| 2006/0276348 A1 | 12/2006 | Cowan |
| 2007/0027036 A1 | 2/2007 | Polizzotti et al. |
| 2008/0017029 A1 | 1/2008 | Kase et al. |
| 2008/0261060 A1 | 10/2008 | Yamaguchi |
| 2008/0300339 A1 | 12/2008 | Wright et al. |
| 2009/0038855 A1 | 2/2009 | Ravi et al. |
| 2009/0114450 A1 | 5/2009 | Watkins et al. |
| 2009/0117374 A1 | 5/2009 | Hamada et al. |
| 2009/0151944 A1 | 6/2009 | Fuller et al. |
| 2009/0163388 A1 | 6/2009 | Reddy et al. |
| 2009/0197068 A1 | 8/2009 | Yamaguchi et al. |
| 2009/0264321 A1 | 10/2009 | Showalter et al. |

OTHER PUBLICATIONS

English translation of Abstract of JP2009235297, published Oct. 15, 2009, provided by IP.com, Inc., 1 page.

Chen, R. H. et al., "Effect of Preparation Method and Characteristics of Chitosan on the Mechanical and Release Properties of the Prepared Capsule", J. Applied Polymer Science, 1997, 66, pp. 161-169.

Deng, M. et al., "Coacervation of Cationic Gemini Surfactants with Weakly Charged Anionic Polyacrylamide", J. Phys. Chem B, 2009, 113, pp. 9436-9440.

Dickinson, P. R. et al., "Kinetics and Mechanisms of Thermal Imidization Studies by UV—Visible and Fluorescence Spectroscopic Technique", Macromolecules, 1992, 25, pp. 3758-3768.

Hsiao, S. et al., "Polyimides Derived from Novel Asymmetric Ether Diamine", Journal of Polymer Science, 2005, 43, pp. 331-341.

Huang, H. et al., "Microencapsulation Based on Emulsification for Producing Pharmaceutical Products: A Literature Review", Dev. Chem. Eng. Mineral Process, 2006, 14, pp. 515-544.

Kailani, M. H. et al., "Chemical Imidization Study by Spectroscopic Techniques: 1. Model Amic Acids", Macromolecules, 1998, 31, pp. 5771-5778.

Kailani, M. H. et al., "Chemical Imidization Study by Spectroscopic Techniques: 2. Polyamic Acids", Macromolecules, 1998, 31, pp. 5779-5784.

Leclercq, S. et al., "Effects of Cross-Linking, Capsule Wall Thickness, and Compound Hydrophobicity on Aroma Release from Complex Coacervate Microcapsules", J Agric. Food Chem, 2009, 57, pp. 1426-1432.

Liaw, D. et al., "Synthesis and properties of new polyimides derived from 1,1-bis[4-(4-aminophenoxy)phenyl]cyclododecane", Polymer, 1999, 40, pp. 3183-3189.

Madene, A. et al., "Flavour encapsulation and controlled release—a review", International J. Food Science and Technology, 2006, 41, pp. 1-21.

Padwa, A. R. et al., Kinetics of Amine-Cyclic Anhydride Reactions in Moderately Polar Solutions, Journal of Polymer Science, 1995, 33, pp. 2165-2174.

Park, S. K. et al., "Dry-jet wet spinning of aromatic polyamic acid fiber using chemical imidization", Polymer, 2001, 42, pp. 10087-10093.

Sakayori, K. et al., "Synthesis and Properties of Poly(amic acid)s and Polyimides Based on 2,2',6,6'-Biphenyltetracarboxylic Dianhydride", Journal of Polymer Science, 2006, 44, pp. 6385-6393.

SYSTEMS AND METHODS FOR FORMING HIGH PERFORMANCE COMPRESSIBLE OBJECTS

CROSS REFERENCE TO RELATED APPLICATIONS

This application is the National Stage of International Application No. PCT/10/47803, filed Sep. 3, 2010, which claims the benefit of U.S. Provisional Application No. 61/265,222, filed Nov. 30, 2009, the entirety of which is incorporated herein by reference for all purpose.

FIELD

The present disclosure relates generally to methods of fabricating objects of polyimide materials. More particularly, the present disclosure relates to methods of fabricating compressible beads from polyimide materials and to beads made through such methods.

BACKGROUND

This section is intended to introduce the reader to various aspects of art, which may be associated with embodiments of the present invention. This discussion is believed to be helpful in providing the reader with information to facilitate a better understanding of particular techniques of the present invention. Accordingly, it should be understood that these statements are to be read in this light, and not necessarily as admissions of prior art.

Hydrocarbons have been important to civilization for centuries. In the relatively recent past, the efforts to find, access, extract, and utilize hydrocarbons have become increasingly complicated. Present hydrocarbon recovery operations require drilling and completions equipment to reach far beneath the earth's surface and/or to reach across long horizontal distances. Those in the industry are ever more aware of the need for deepwater wells, extended reach wells, ultra-extended reach wells, and other drilling scenarios that push drilling, completions, and subsurface technologies to the extremes. For example, some reservoirs may not be deep or far from the rig, but nevertheless may be difficult to reach due to the types of formations through which the well must extend. The equipment costs, time, and labor costs associated with drilling a well for use in hydrocarbon recovery operations is extremely high in conventional wells. As the need for longer, deeper, and/or more complicated wells becomes more common, the increased costs are making many projects economically less advantageous. In some scenarios, the economics of accessing the reserves make the reserves inaccessible. Accordingly, while the hydrocarbon recovery industry has developed great technology in the past, there is a continuing need to improve upon the past technologies and to make step changes from conventional practices.

One challenge in drilling any well is maintaining the pressure in the annulus between the pore pressure gradient and the fracture gradient. As is well understood, the pore pressure gradient relates to the pressure of the formation fluids and is the pressure above which the annulus must be maintained to prevent formation fluids from entering the annulus. The fracture gradient relates to the strength or integrity of the formation and is the pressure below which the annulus must be maintained to prevent fracturing the formation. Maintaining the annulus pressure at or above the pore pressure gradient can be effective in minimizing the risk of blow-outs, kicks, and other problems associated with the unexpected inflow of formation fluids. Maintaining the pressure at or below the fracture gradient can be effective in minimizing the risk of fractures, lost returns, and other problems and complications associated with fracturing the formation. There are various reasons why the annulus pressure should be maintained between the pore pressure gradient and the fracture gradient; these are provided as merely illustrative examples. FIG. 1 presents one schematic representation of the pore pressure gradient (PPG) 102 and the fracture gradient (FG) 104 in a plot 100 of depth 106 against gradient 108. As can be seen in the plot 100, both the pore pressure gradient and the fracture gradient increase with the depth of the well.

The need to maintain the annulus pressure within these bounds has been understood for many years and several methods and tools have been developed to facilitate efforts to meet that need. One example of such methods and tools is the use of drilling muds customized for a particular well and/or for a particular interval of a well. Drilling muds of a variety of constitutions have been developed and utilized over the years, with the muds including a variety of additives. The variety of drilling muds and additives have been developed to provide muds of different densities, which is often referred to as the effective mud weight or density equivalent when taking into account the effects of the hydrostatic head. The selection of a mud having a particular mud weight allows the operator to customize the pressure of the annulus to correspond with the conditions in the open hole section of the wellbore. While this principle is quite conventional, FIGS. 1 and 2 help to illustrate at least one limitation of this conventional approach. FIG. 2 illustrates in plot 200 the density equivalent 208 (in pounds per gallon) of a modeled conventional mud 210 as a function of depth 206 (in 1000 meters). In FIG. 2, the conventional mud 210 is modeled in two different states, while circulating in the well 210' and while static in the well 210". As can be seen in FIG. 2, the equivalent density of the conventional mud does not change at a pace sufficient to follow the increase in the pore pressure gradient 202 or the fracture gradient 204. If the conventional mud 210 were pumped to drill in the exemplary well modeled in FIG. 2, it would have a suitable mud weight below 3500 meters (to some point not shown), but would fracture the well at depths shallower than 3500 meters.

The risk of fracturing the well at those more shallow depths, also referred to as upper intervals, is commonly addressed through the installation of casing in the well. As is well known, casing consists essentially of tubulars disposed in the well and cemented into place to provide a barrier between the well and the formation. The casing may include a variety of materials and may be installed in a multitude of manners depending on the condition of the well, the formation, etc. Once the casing is in place, the casing itself increases the structural integrity of the wellbore wall and retains the formation fluids behind the casing preventing kicks, blowouts, etc. FIG. 1 illustrates schematically the impact of casing in the well. Casing 112 is installed at various locations in the well effectively defining drilling intervals. Different conventional drilling muds 110 are used in each drilling interval, with each mud 110 having a different effective mud weight adapted for the particular interval. As can be seen in FIG. 1, the effective mud weight of the drilling mud 110 for a particular interval is conventionally adapted to correspond with the fracture gradient at the top of the interval and to more closely correspond with the pore pressure gradient at the bottom of the interval. As the density equivalent of the mud approaches the pore pressure gradient, the drilling is conventionally stopped and the recently drilled interval is cased before progressing to the next interval with a different drilling mud.

While casing can be used to overcome the pore-pressure-gradient/fracture-gradient (PPG/FG) problem once the casing is installed, it does not solve all of the problems. For example, casing is of little value when actively drilling. This is illustrated in FIG. 1 by the numerous casing strings that must be installed and the different types of muds required to drill to the desired depth. It can be readily appreciated that the drilling operations are stopped while casing is run into the well and installed in the desired position. The time lost in waiting for the drill tool to be tripped out of the well, the casing to be tripped into the well and cemented in place, and then to re-trip the drilling equipment into the well can significantly increase the time requirements for a drilling operation. As the manpower and equipment costs are generally time-based and expensive, the delays required to introduce casing into the well significantly increase the cost of drilling operations. While the additional time requirements of installing the casing are significant disadvantages, the casing presents still further issues that render them a less than desirable solution. As a simple example, the casing itself adds costs and its installation adds complexity to the well construction and to the completion and production of the well (for example, the inclusion of casing may require perforations to re-open the formation to the well annulus).

As a more involved, but equally readily appreciated example, the use of multiple casing strings has the impact of reducing the diameter of the well. Absent relatively complex and/or expensive under-reaming operations and expandable casing, the casing strings installed in a well are typically in a nested arrangement. In such a nested arrangement, the casing for a lower interval of the wellbore is nested inside the casing for an upper interval. The nesting arrangement may require the well to be excessively large at the surface and/or may limit the depth of the well by decreasing the diameter of the well before the target depth is reached. This is particularly disadvantageous when the actual PPG/FG operating window is more narrow than expected resulting in a larger than expected number of distinct drilling intervals and casing intervals. With the telescoping nature of the casing intervals, the additional casing intervals may limit the total depth attainable and may prevent the drilling operation from reaching a target depth.

While operators in the hydrocarbon recovery industry, such as drilling companies, service companies, etc., have developed a number of drilling muds and mud additives, the conventional drilling muds are effectively static throughout their journey through the well (as illustrated in FIG. 2). While this is acceptable within the paradigm of conventional drilling operations, it can be associated with the need for shorter casing intervals, rapidly narrowing wellbore diameters, etc. In the recent past, several publications have suggested an alternative paradigm for drilling muds: drilling muds having a dynamic mud weight or density during the drilling operation. For example, and as is well explained in several earlier applications, drilling muds comprising compressible objects result in a drilling mud having a variable density or variable mud weight. It can be readily understood that if a plurality of compressible objects are reduced in size in response to increasing hydrostatic pressure, the mud weight would increase in correspondence with the number of objects undergoing compression and the relative degree of compression. More thorough descriptions of variable density drilling muds can be found in various prior publications, including: US Patent Publication Nos. 20070027036; 20090084604; 20090090558; 20090090559; and 20090091053, each of which is incorporated herein by reference in their entirety for all purposes. Additional discussion of drilling muds having a potentially variable density can be found in U.S. Pat. Nos. 7,108,066 and 7,482,309 and US Patent Publication Nos. 20050284641; 20050161262; 20050113262; 20060254775; 20090114450; and 20090163388.

FIG. 2 provides a schematic, representative illustration of this effect by illustrating the effective density 208 of a variable density mud 220, in both the circulation mode 220' and the static mode 220". As can be seen, the compressible objects can be adapted to provide a drilling mud having a variable density adapted to follow the pore pressure gradient and the fracture gradient. In some implementations, the variable density mud can be used to extend the length of a drilling interval sufficient to reduce the total number of casing strings (or the number of drilling intervals) resulting in cost and time savings and potentially deeper or longer wells. FIG. 3 illustrates the exemplary variable density drilling mud 320 in comparison to the convention drilling mud 310 and casing 312 combination. The remaining features in FIG. 3 are referenced by numbers corresponding to those of FIGS. 1 and 2. As can be seen in FIG. 3, for the segment illustrated, the variable density drilling mud 320, representatively, eliminates the need for as many as three casing strings.

As illustrated in FIG. 3 and the several prior patent applications referenced above, the potential benefits of using a variable density mud in hydrocarbon recovery operations are great in the context of drilling operations. Additionally, there may be various other beneficial uses of such a fluid or of fluids comprising compressible objects. Regardless of the end use of the compressible objects and/or muds comprising the same, it can be appreciated that the conditions under which these compressible objects must operate can be severe and can vary widely in the various environments in which hydrocarbon recovery operations occur. While the above-referenced publications disclose a variety of possible constructions and configurations for the compressible objects, it is presently believed that some of those proposed are better than others. Moreover, while various methods of making such compressible objects were disclosed in several of the above-referenced publications, suitable and/or optimal methods of manufacturing such compressible objects continue to evolve. For example, as the operating conditions under which the compressible objects will be used are better understood, the methods of making such compressible objects need to evolve to meet those conditions. Accordingly, the need continues to exist for improved methods of fabricating compressible objects suitable for use in hydrocarbon recovery operations, including drilling operations.

In at least some of the above-referenced publications, the present inventors disclose various properties of compressible objects suitable for such applications. For example, it was disclosed that the compressible objects could be provided in a variety of shapes but that spherical or spheroidal shapes were preferred over shapes having sharp angles. Similarly, it was disclosed that an oblate disk having a range of aspect ratios (major axis; minor axis) may be preferred to obtain certain desired properties, such as tensile strength, elasticity, etc. A variety of materials were disclosed for use in making such compressible objects and a variety of methods were similarly disclosed. For example, polymers and other materials were disclosed as possible wall materials, particularly polymers known for having high strength and low permeability properties, such as polyimides. Similarly, the present inventors previously disclosed methods of making such compressible objects from polymers and other materials including molding the objects, forming the objects from a plurality of component parts, and forming bubbles or droplets of the polymer.

Among the variety of polymers that may be used to provide a compressible objects, polyimides have been described as viable candidates. Polyimides are a class of polymers that have been known for decades. Polyimides are conventionally used in a limited sub-set of forms due to the complex chemistry and condition requirements involved in converting the polyamic acid to a polyimide, which may be referred to as the imidization reaction. It is generally recognized that the polyamic acid to polyimide reaction was discovered many years before the first workable or usable form of polyimide was developed due to the complexity of controlling the imidization reaction, of providing the proper reaction conditions while forming the polyimide product, etc. At the time the present technologies were developed, polyimides were available as films, membranes, foams, fibers, and coatings. Most available polyimides were generally thin, substantially two-dimensional products. Hollow polyimide fibers have been developed in the more recent past using certain polyamic acids and under conditions conducive to the formation of membranes, which is the primary use of such fibers. As is generally understood, the final polyimide product may have vastly different properties depending on the conditions of the reaction and depending on the polyamic acid selected. Accordingly, while a particular fabrication technique may be suitable for a given polyamic acid being imidized for forming a membrane, the same fabrication technique may be inapplicable if attempting to imidize the same polyamic acid into an impermeable barrier film.

From the above discussion, it can be understood that compressible objects have applicability in hydrocarbon recovery operations at least as a component in drilling muds. Moreover, it can be understood that while any compressible object may be used to provide some value, optimized compressible objects will be suited for the conditions in which they will be used, such as to enable recycle and reuse of the compressible objects during one or more drilling operations. In addition, high mechanical integrity is required to predictability compress, deform and subsequently decompress and re-establish the bead configuration. Still further, while several variations of compressible objects have been proposed in the above-referenced publications, methods of forming the compressible objects to have desired configurations and properties are still needed. The present disclosure provides methods of fabricating compressible polyimide objects and discloses compressible polyimide beads made by such methods. More particularly, the present disclosure provides methods of fabricating compressible polyimide objects suitable for use in hydrocarbon recovery operations.

SUMMARY

The present application is directed to systems and methods for producing compressible objects for use in hydrocarbon recovery operations. The compressible objects may be hollow (i.e., gas-filled) or foam-filled. In either event, the compressible objects have an impermeable shell adapted to retain a pressurized gas interior. The internal pressure of the compressible objects may vary depending on the particular use, but may exceed 1000 psi. Accordingly, the mechanical properties of the shell are of particular importance to avoid leakage, breakage, or other undesirable affects during the hydrocarbon recovery operations. The present application describes several methods and systems suitable for the production of such compressible objects.

The present systems and methods utilize a polyamic acid solution as a precursor to form a polyimide bead having the desired properties. Forming a polyimide from polyamic acid is not itself new, but the particular methods used to shape and form the polyamic acid solution for imidization into the desired form are significant improvements in the art of imidization methods. In exemplary methods, the polyamic acid solution is shaped (e.g., formed into a droplet) and then the polyamic acid is concentrated by extraction of the solvent from the polyamic acid solution. The concentrated polyamic acid solution is then better able to retain its shape during subsequent processing steps, such as drying and pressurizing, before final thermal imidization.

In other exemplary methods, the polyamic acid solution is shaped, such as into a polyamic acid droplet, before being subjected to a chemical imidization agent. The chemical imidization agent begins to imidize the outer surface of the polyamic acid droplet forming a polyamic acid bead. The imidization reaction is quenched before the shell being formed is completely imidized. The partially imidized outer shell is then able to retain its shape during subsequent processing.

As described in greater detail herein, the chemical imidization and the non-solvent extraction methods may each include drying steps that mobilize the internal polyamic acid solution toward the inner surface of the exterior wall or shell for deposition of the polyamic acid and permeation of the evaporating solvent through the exterior wall. The methods further include pressurization and thermal imidization of the polyamic acid beads.

The present application further provides illustrative examples of methods of forming a polyamic acid droplet. For example, droplets may be formed using a drop-tower type system that drops polyamic solution into non-solvent and/or chemical imidization baths. Additionally, the present application discloses various methods of applying polyamic acid solution as a coating on a substrate (gas bubbles, solvent bubbles, etc) that can then be processed, such as by non-solvent extraction or chemical imidization, to form polyamic acid beads and to form polyimide beads.

BRIEF DESCRIPTION OF THE DRAWINGS

The foregoing and other advantages of the present technique may become apparent upon reading the following detailed description and upon reference to the drawings in which.

DETAILED DESCRIPTION

Figure 2:
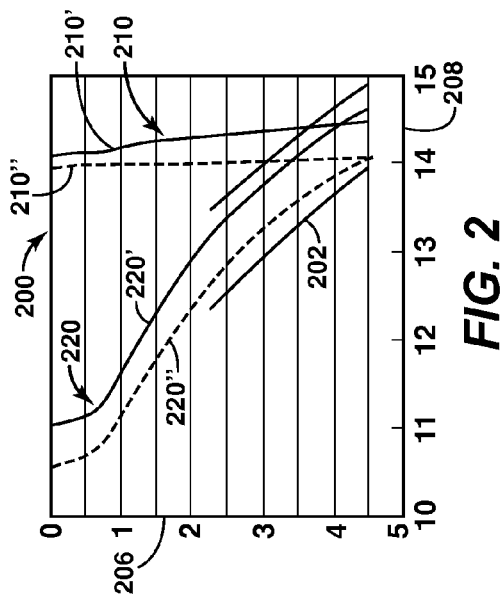
FIG. 2 is a schematic illustration of the mud density over drilling depths for both a conventional drilling mud and a variable density drilling mud, such as may be formed using compressible objects of the present inventions.
Figure 1:
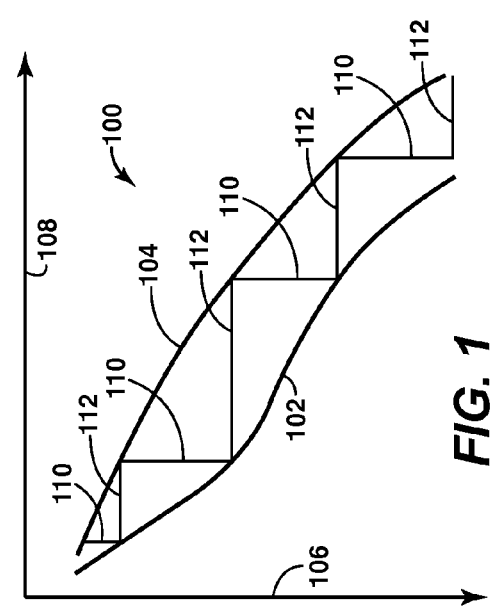
FIG. 1 is a schematic illustration of the relationship between a pore pressure gradient and a fracture gradient and its impact on drilling operations.
Figure 3:
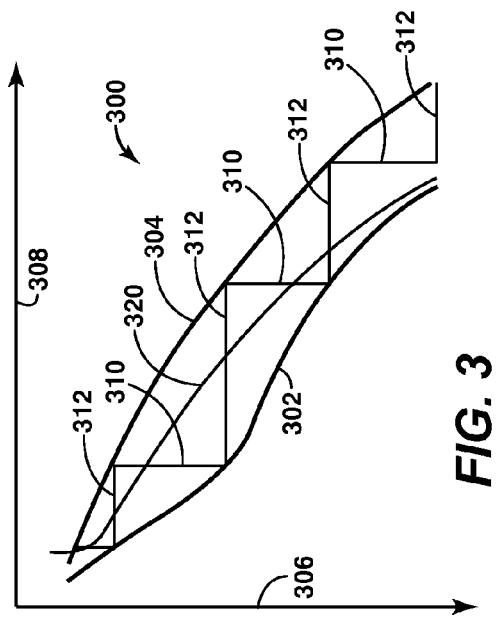
FIG. 3 is a schematic illustration similar to FIG. 1 and showing the potential impact of variable density drilling muds on drilling operations.

In the following detailed description, specific aspects and features of the present invention are described in connection with several embodiments. However, to the extent that the following description is specific to a particular embodiment or a particular use of the present techniques, it is intended to be illustrative only and merely provides a concise description of exemplary embodiments. Moreover, in the event that a particular aspect or feature is described in connection with a particular embodiment, such aspects and features may be found and/or implemented with other embodiments of the present invention where appropriate. Accordingly, the invention is not limited to the specific embodiments described below, but rather; the invention includes all alternatives, modifications, and equivalents falling within the scope of the appended claims.

As described above, various publications have suggested the use of polymers, including polyimides, in the manufacture of compressible objects. While polyimides have been formed into a variety of substantially two-dimensional objects, the fabrication of polyimide three-dimensional objects having properties suitable for use as compressible objects in a variable density drilling mud has presented certain challenges. As used herein, for the purpose of greater clarity, the term compressible objects may be substituted by the somewhat more specific term compressible beads. As used herein, the term bead, such as in the context of compressible beads or polyimide beads, shall be understood to refer to a variety of object configurations similar to a bead. For example, the term bead will be used to refer to spherical objects and to spheroidal objects, ellipsoidal objects, disks, pillows, and other such terms that may be understood to refer to a three-dimensional object having generally smooth edges. The fabrication methods described herein may be adapted in a number of ways to modify the final shape of the polyimide bead to a final desired shape. While a sphere may be preferred in some implementations, it should be understood that the compressible beads, or the polyimide beads, of the present disclosure may have an aspect ratio (measured as the ratio of the major axis to the minor axis) from about 1:1 to about 10:1. The selection of the final shape or configuration of the polyimide beads may depend on the intended utilization of the polyimide beads. Additional information regarding the shaping and the properties of the beads will be provided below.

Mechanical Properties

The methods and systems of the present disclosure may be adapted to produce or fabricate polyimide beads of various configurations and having diverse properties. Exemplary configurations and properties will be discussed in connection with the description of specific methods and systems; a more generalized description is provided here. Polyimide beads having any combination of the properties and configurations described herein are considered within the scope of the present inventions. It should be understood that the final size of the polyimide beads will depend on a number of factors. Understandably, the final size may be heavily influenced by the size and configuration of the equipment used to form the initial droplet of polyamic acid. Additionally, the size may be affected by the decision to include an internal blowing agent, the heating schedule during the methods steps preceding the imidization stage, the pressure and heating schedules during the imidization stage, and other factors during the fabrication methods, each of which will become more clear through the description provided herein. Suitable sizes for the polyimide beads may be determined by the intended usage of the particular beads. For example, a single hydrocarbon recovery operation, such as drilling a single well, may suggest the use of a variety of different polyimide bead configurations to maintain the mud weight between the pore pressure gradient and the fracture gradient. This section of the present disclosure provides exemplary descriptions of various mechanical properties and configurations that may be suitable for the polyimide beads made by the present methods. While the discussion in this section identifies exemplary ranges of properties and methods of determining such properties, such discussion is for exemplary, non-limiting purposes only.

Figure 4B:
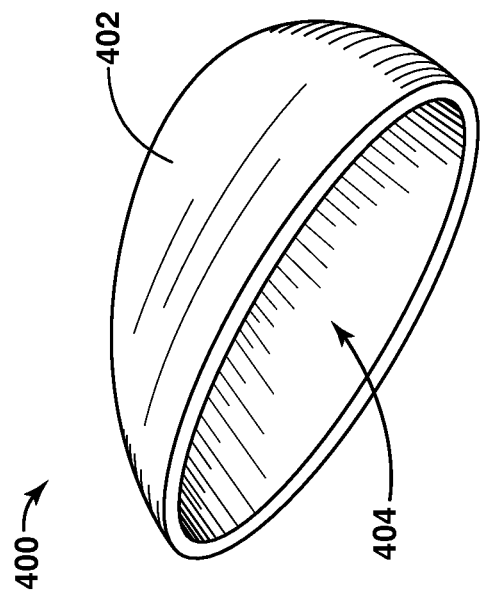
FIGS. 4*a* and 4*b* are schematic illustrations of an exemplary compressible bead.
Figure 4A:
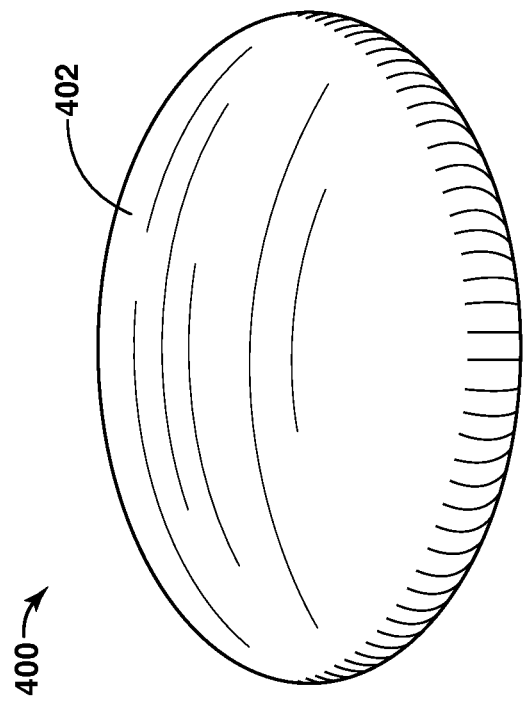

As suggested by the foregoing description, the present methods may result in gas pressurized compressible polyimide beads. An exemplary illustration of a compressible polyimide bead is shown in FIGS. 4a and 4b. As shown, the polyimide bead 400 comprises a shell 402 and a hollow center 404, which may contain a high pressure gas inside the shell. The compressible polyimide beads 400 may preferably have smooth, or continuous, outer surfaces. Preferably, the polyimide beads 400 will have smooth outer surfaces before, during, and after compression. The general shape of the polyimide beads, including the smooth surfaces may be adapted to minimize the interactions between the compressible objects and between the compressible objects and the base drilling mud. For example, the interactions between the polyimide beads or between the beads and the mud may affect the viscosity of the mud or lead to local aggregation of the beads, neither of which is desired.

The overall size of compressible polyimide beads 400 may be between about 0.05 mm and about 3 mm, which may be measured by the diameter of the bead. It is presently believed that a size between about 1 mm and about 2 mm is preferred. The upper limit of the size may be limited by the particulate handling capability of pumps, nozzles, and other equipment in drilling mud operation systems. While the equipment may not limit the smallest size of the polyimide beads, the smaller size can reduce the available compressible space for the beads. As the compressibility of the bead is desired to provide the variable density, the smallest size of the beads may be limited by the desired variability in the mud density and the requisite compressibility of the polyimide beads. In some implementations it may be desired to maximize the size of the polyimide beads to the degree permitted by the planned drilling equipment.

As suggested by the discussion herein, some polyimide beads of the present disclosure may contain a high pressure gas within a shell 402. The internal gas pressure may vary depending on the intended use of the polyimide beads. For example, beads intended for use at shallow depths may have a lower pressure than beads intended for deeper drilling intervals. While individual beads can have different internal pressures, some beads may preferably be pressurized up to greater than 5000 (psi). While elevated internal pressure may be desired for the deeper and higher pressure wells, the internal pressure may be limited by the wall thickness and the materials selected for the polyimide beads (e.g., the stiffness and tensile strength of the shell materials). While a thicker wall can hold higher internal pressures, thicker walls may also experience higher strain during large deformation. Moreover, thicker walls reduce the space available for compression of the polyimide bead. The volumetric compression ratio of polyimide beads is the ratio of the volume of the bead at the fully expanded stage over the volume of the bead at the fully compressed stage. For most applications, it may be preferred to maximize the volumetric compression ratio. For example, a higher volumetric compression ratio may reduce the number of beads needed to accomplish the mud weight variation. Moreover, the larger volumetric compression ratio may provide a wider mud density window for a given batch of polyimide beads. That is, a single batch of polyimide beads may be used to drill a longer segment due to providing a larger window of mud weights as the beads compress through a larger differential volume.

The interplay in design features imposed by the combination of the above factors should be apparent. For example, the drilling equipment limits the maximum size of the compressible beads while the desire for a larger volumetric compression ratio suggests a larger bead. Similarly, the need to retain high internal pressures suggests thicker walls, while the desire to minimize strain and to maximize volumetric compression ratios suggests thinner walls. Each of these factors may be considered in developing the geometry or architecture of the polyimide beads. Additionally or alternatively, each of these factors may be considered in selecting the materials, or combination of materials, and the methods to be used in fabricating the polyimide beads.

As discussed in at least some of the previously incorporated patent applications, these geometry design factors may result in the use of compressible beads having three primary stages during use: fully expanded, neutral, and fully compressed, with various gradations between the extremes. FIGS. 5, 6, and 7 illustrate schematic representations of exemplary polyimide beads in each of these stages. At the preparation stage and prior to traveling into the wellbore, the external conditions on the polyimide beads are atmospheric pressure and environmental temperature ranging from −40° C. to 80° C. depending on where the beads are being stored or used. Under these conditions, the beads 500 are experiencing expansion under the internal gas pressure, as shown in FIG. 5a. The design priorities at this stage are on the ability of the shell 502 to hold the high pressure gas.

Figure 5B:
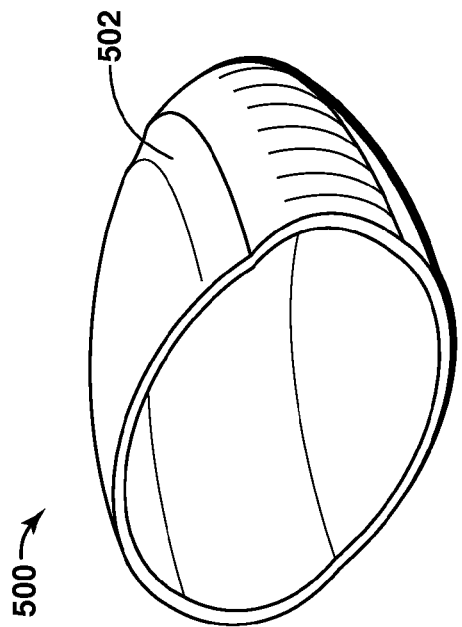
FIGS. 5*a* and 5*b* are schematic illustrations of an exemplary compressible bead in an expanded state.
Figure 5A:
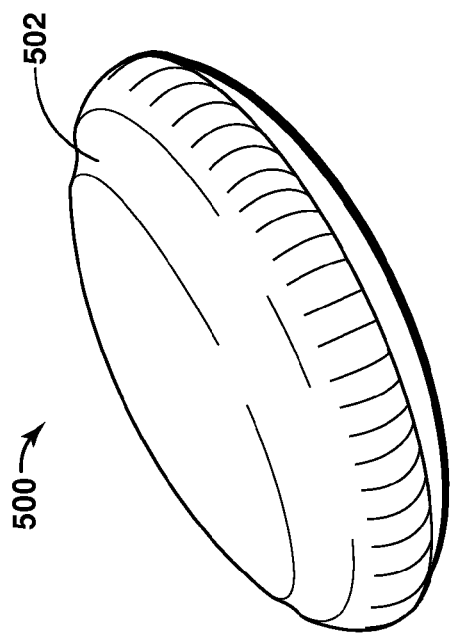
Figure 6:
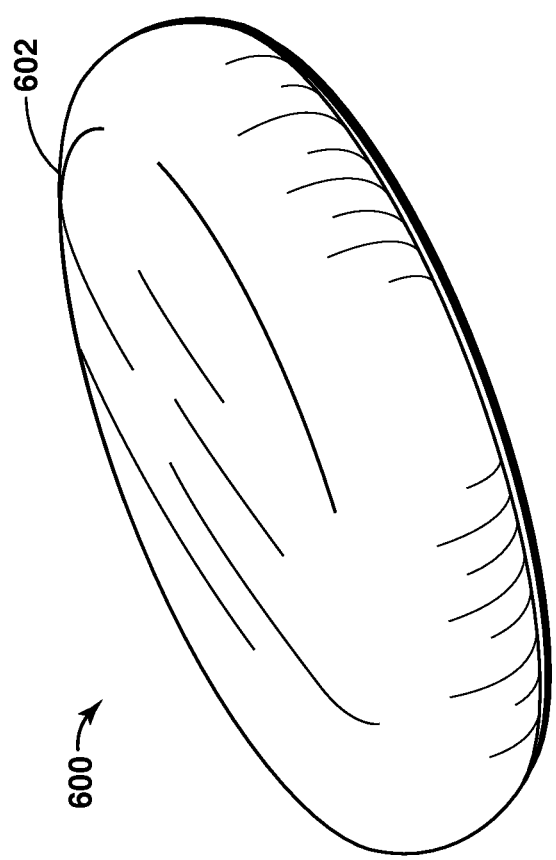
FIG. 6 is a schematic illustration of an exemplary compressible bead in a neutral state.

FIG. 5b provides a schematic, cross-sectional view of an expanded polyimide bead 500 showing the strains on the shell 502 in the expanded state. The illustrated strain distribution was obtained using nonlinear finite element analysis.

Figure 7B:
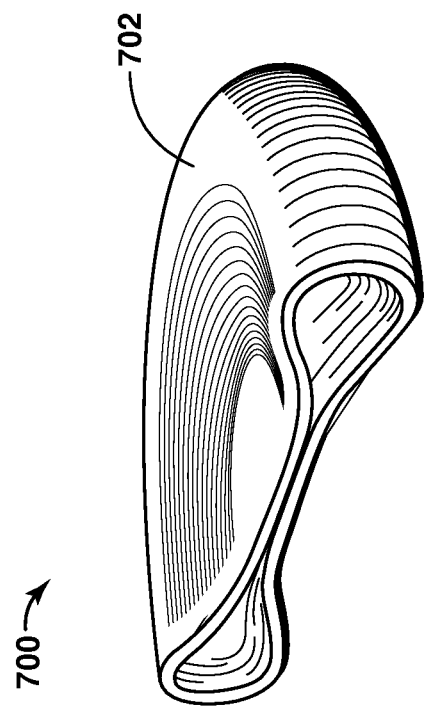
FIGS. 7*a* and 7*b* are schematic illustrations of an exemplary compressible bead in a compressed state.
Figure 7A:
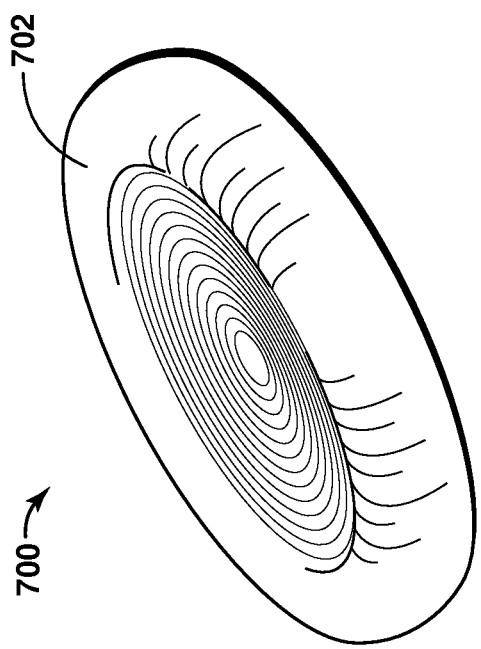

During the drilling operation stage, these compressible beads will go through the drilling mud operation system and experience cyclic compressions and expansions. The design priorities when considering the drilling operations and the beads functionality during drilling focus on the optimal geometry and materials to allow these compressible beads to experience large deformations without buckling under compression. FIG. 6 illustrates schematically a neutral stage where the shell 602 is neither expanded nor compressed. As may be understood, the strains on the shell 602 are minimized at this stage. However, due to the desire to maximize the volumetric compression ratio, the beads will preferably compress beyond the neutral stage to the fully compressed stage illustrated in FIG. 7a. FIG. 7b provides a schematic, cross-sectional view of a compressed polyimide bead 700 showing the strains on the shell 702 in the compressed state. The illustrated strains are exemplary only and for the purposes of illustration. As with FIG. 7b, the illustrated strain distribution of the compressible object was obtained using nonlinear finite element analysis.

FIGS. 5-7 illustrate the stages of deformation for an exemplary polyimide bead. The illustrated polyimide bead is shaped as an oblate sphere, which is one example of a suitable polyimide bead configuration. The oblate sphere may be preferred in some situations, but the deviation from a sphere (or other defined shape) suggests the need to determine the optimal degree of deviation from a 3-dimensional symmetric shape. The following passages and associated Figures help to illustrate exemplary considerations and exemplary configurations that are presently believed to be preferred.

Figure 8:
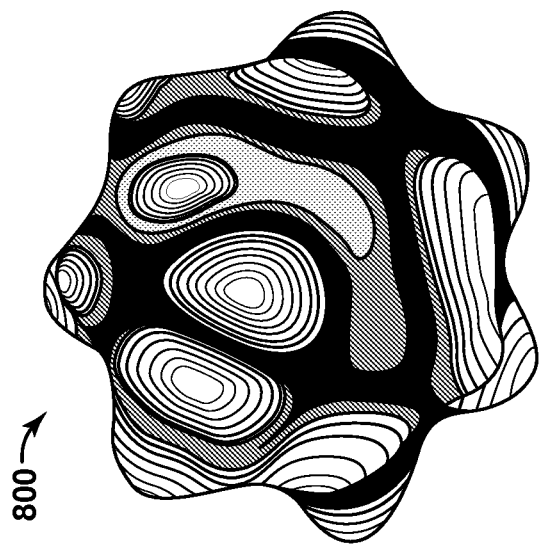
FIG. 8 is a schematic illustration of a compressed sphere buckled under compressive forces.

While compression under external pressure is desired when using the polyimide beads produced from the present methods and systems, buckling of the shell is not desired. The controlled deformation (compression and expansion) of the present beads during use is illustrated by FIGS. 5-7. In contrast, FIG. 8 illustrates a bead 800 that is buckled under compression. Beads or objects experience controlled deformation or buckling depending on the ability of the bead geometry and materials to balance the external loads and the internal forces. During controlled deformation, an object can generate internal forces sufficient to balance the external pressure. Buckling occurs when an object cannot generate enough internal forces to balance the external pressure and has to jump to a different geometry configuration to establish a new balance. Buckling is not a steady change and it will cause a sudden jump in volumetric compression ratio. In the drilling applications, buckling of the compressible beads is not preferred for a variety of reasons. For example, the buckling may be result in a geometry that causes aggregation or interference in mud flows. Additionally or alternatively, a sudden jump in volumetric compression ratio may cause instability in drilling mud flow.

To avoid buckling in gas-pressurized, compressible beads during compression, the geometry of the beads should have a preferred deformation direction. These objects have a bending stiffness (resistance to compression force) in this preferred direction significantly lower than the bending stiffness in any other direction normal to this preferred direction. As can be understood, a spherical shell is symmetric about all three axes ($Rx=Ry=Rz=a$). This symmetry causes spherical shells to have equal stiffness in all directions. Without a preferred deformation direction, a spherical shell strongly resists volume change until it buckles. Once buckled, it losses its symmetries and becomes weak in resistance to external pressure. Moreover, the buckled shape of a spherical shell will generally be irregular, as shown in FIG. 8, and highly dependent on the initial variations in mechanical properties (such as crystalline orientation in polymeric materials), in shell thickness, in geometry symmetry, and in external pressure. Therefore, a perfectly spherical shell is not the right architecture for compressible beads for use in the drilling applications.

Figure 9A:
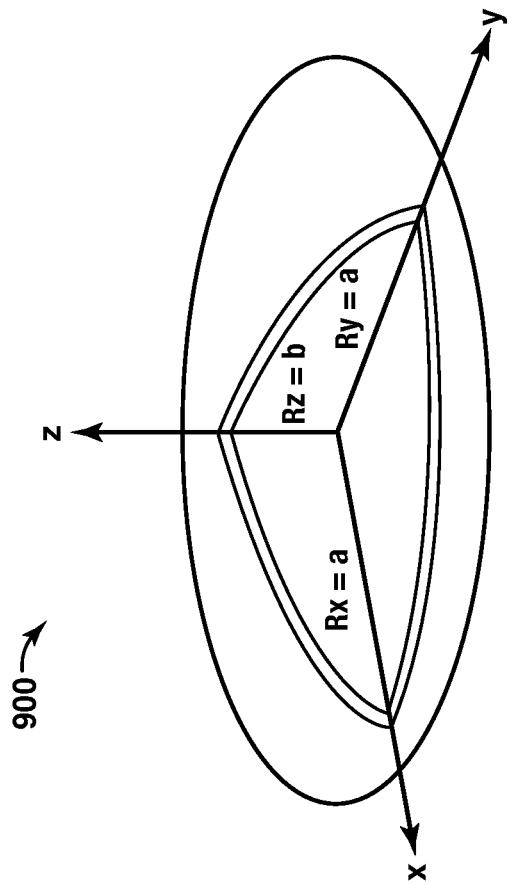
FIGS. 9*a*, 9*b*, and 9*c* are schematic illustrations of compressible beads shaped to compress predictably and controllably.

In order to provide the compressible beads with a preferred deformation direction, the compressible beads should have a contrast in bending stiffness in a 3D space. While the contrast in bending stiffness may be provided in a number of manners (e.g., material selection, material processing, etc.), the present discussion illustrates one method utilizing bead architecture or geometry to provide the differing bead stiffness. As illustrated in FIG. 9a, a compressible bead 900 may have an architecture that is axis-symmetric about a z-axis with a dimension in the z-direction that is smaller than in other two directions, i.e. Rz=b<Rx=Ry=a. The aspect ratio a/b is understood to affect both the deformation and the volumetric compression ratio of a compressible bead. If the aspect ratio approaches 1, the shape of the compressible bead approximates a spherical shell and loses the bending stiffness contrast. If the aspect ratio is too large (e.g., >7:2=3.5), the ratio of the volume of wall material over the internal cavity volume of the compressible object may be too large and the volumetric compressible ratio of the compressible object may be too small (<5:2=2.5) to be useful in some drilling applications (e.g., see the above discussion regarding wall thickness and volumetric compression ratios). In some implementations, it may be that preferred aspect ratios are in the range from 5:2 to 7:2 (i.e., from 2.5 to 3.5).

Figure 9B:
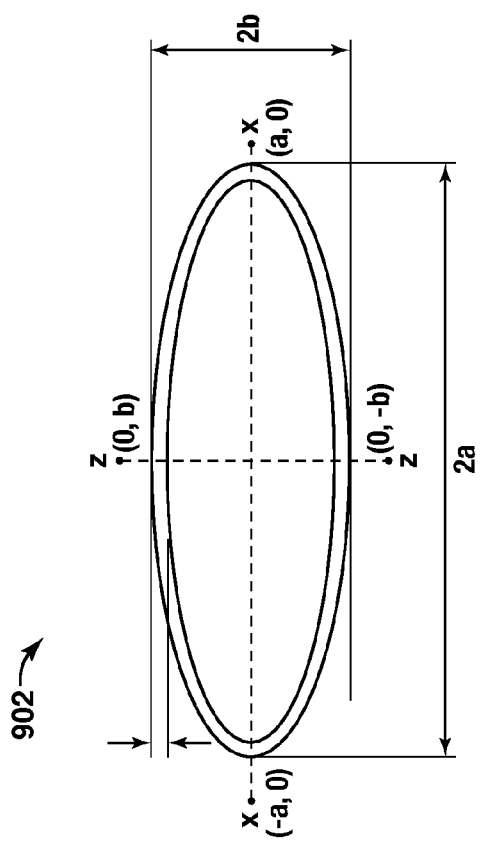
Figure 9C:
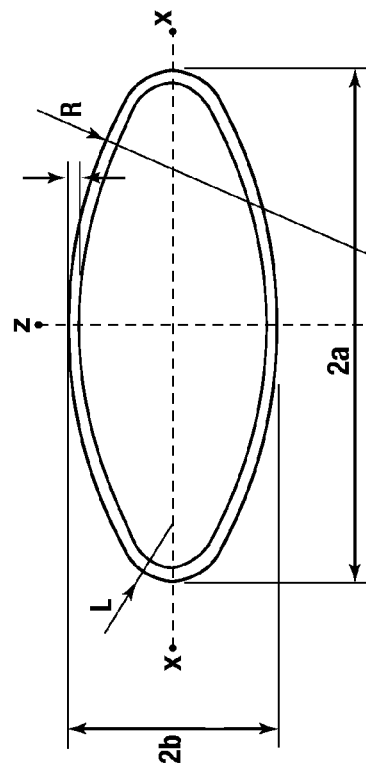

While the aspect ratio of the compressible beads may be effective in providing the desired contrast in bending stiffness, other aspects of bead geometry or architecture may also be varied or controlled to provide the beads with the desired mechanical properties. For example, the curvatures of the surfaces also may be effective parameters for the design of these compressible hollow beads. Nonlinear finite element analysis may reveal optimal curvatures of the surfaces of these compressible objects. For example, FIGS. 9b and 9c illustrate two compressible beads 902, 904 having nearly identical aspect ratios but different surface curvatures. In FIG. 9b, the outline of cross-section is an ellipse and the object is axis-symmetric about the z-axis. The minimum radius $b^2/a$ of curvature of the outside surface occurs at the location ($\pm a$, 0) and the maximum radius of curvature $a^2/b$ of the outside surface occurs at the location (0, $\pm b$). The radius of curvature increases continuously from $a^2/b$ to $a^2/b$. In FIG. 9c, the cross-section of objects 904 consists of arcs tangent to each other. There are two constant radii of curvatures for these arcs. The object is axis-symmetric about the x-axis. This cross-section may be referred to as a dual-curvature design. The arcs passing locations ($\pm a$, 0) have the small radius of curvature while the arcs passing locations (0, $\pm b$) have the large radius of curvature.

In FIGS. 9b and 9c, the small radius of curvature at locations ($\pm a$, 0) directly effects the maximum strain experienced when the object is expanded by internal gas pressure. Increasing this radius can reduce the maximum strain experienced when the object is expanded by internal gas pressure. In three-dimensional space as shown in FIG. 9a, when the compressible object is expanded under the internal gas pressure, the maximum principal strain occurs at the location where the x-axis (and y-axis) intercepts the internal surface. It is also the same location with the minimum principal curvature in the internal surface. Increasing the minimum principal curvature can reduce the maximum principal strain during expansion. In some implementations of the present methods, the polyimide beads may have a ratio of the minimum principal curvature in the internal surface relative to the long radius of the external surface about the z-axis larger than 1:10.

In FIGS. 9b and 9c, the large radius of curvature at locations (0, $\pm b$) effects the bending stiffness of the polyimide bead. Increasing this radius of curvature will reduce the bending stiffness and create a preferred deformation direction along z-axis. The maximum principal curvature of the internal surface is located at both poles along the z-axis as shown in FIG. 9a. The maximum principal curvature of the internal surface affects the bending stiffness contrast of the compressible hollow beads. With a given aspect ratio, increasing maximum principal curvature can reduce the bending stiffness or the resistance to external pressure along the z-axis. In some implementations of the present systems and methods, the polyimide beads made thereby may have a ratio of the maximum principal curvature in the internal surface relative to the long radius of the external surface about the z-axis larger than 2.75

As described above, thicker walls or shells may be able to hold higher internal gas pressure during expansion. However, thinner walls provide more flexibility during compression. The flexibility also depends on the ratio of the wall thickness to the largest radius of the compressible objects. The design of the compressible beads may balance both requirements of flexibility during compression and of strong bending stiffness during expansion. Based on nonlinear finite element analysis, an optimal ratio of the wall thickness to the longest radius of the compressible objects may range from 1:20 to 7:100. The present systems and methods may be adapted, such as by modifying the droplet formation steps and equipment or the non-solvent bath steps and equipment, to provide polyimide beads having such a ratio.

The absolute wall thickness of these compressible objects may depend on the internal gas pressure level and the mechanical behaviors of the wall materials. The absolute wall thickness may be estimated by the formula in equation (1):

$$\frac{pR}{tE} < \alpha \qquad (1)$$

where R is the largest radius in the xy-plane shown in FIG. 9a. p is the internal gas pressure at conditions of atmosphere pressure and room temperature. t is wall thickness. E is the elastic modulus of the wall material. The design control parameter a may vary depending on the application or use of the compressible beads, the particular materials used in forming the polyimide beads, the conditions implemented during the bead fabrication process, etc. Without being bound by theory, it is presently believed that a design control parameter $\alpha$=0.1 may be preferred in some implementations.

As discussed above, the specifics in the foregoing description of polyimide bead configurations and parameters is for illustrative and exemplary purposes only. The principles discussed above and their importance in the systems and methods herein will become more apparent through the remaining description.

Systems And Methods

Figure 10:
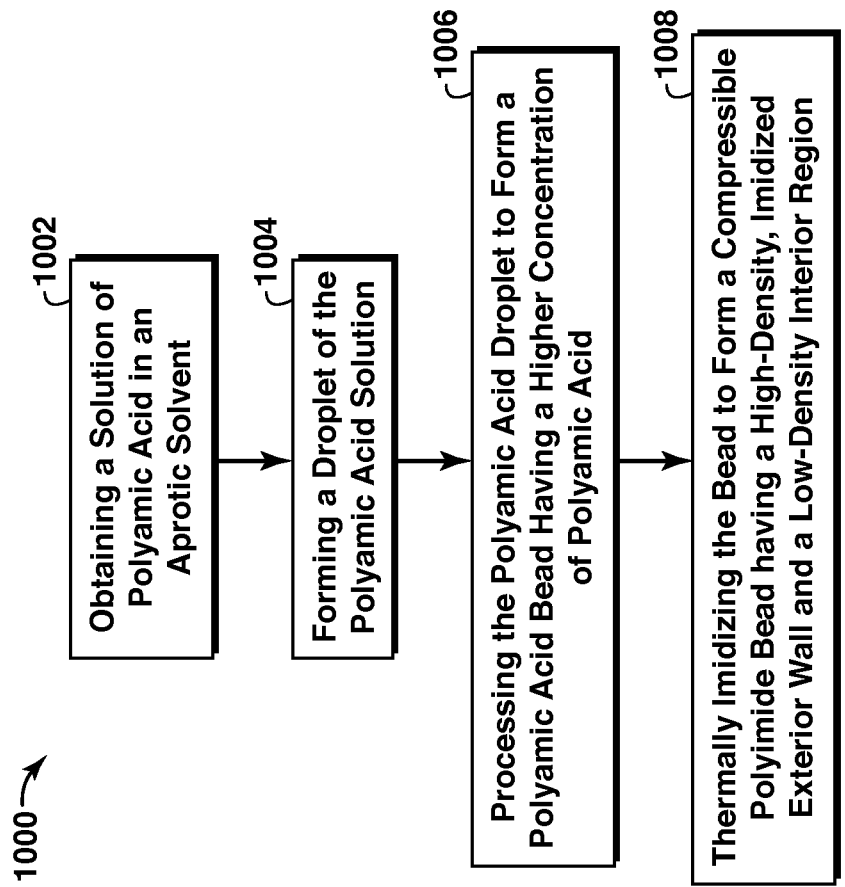
FIG. 10 is a generalized flow chart of methods within the scope of the present disclosure.

FIG. 10 illustrates, by way of a schematic flow chart, methods 1000 within the scope of the present invention that have been developed to fabricate such compressible polyimide beads. The methods 1000 will be described as an overview in their entirety before returning to discuss the steps and features in greater detail. Additionally, variations on one or more of the steps illustrated here will be described in later sections of the present disclosure. As illustrated, the methods 1000 begin by obtaining a solution of polyamic acid in an aprotic solvent, at 1002. The methods 1000 continue by forming a droplet of the polyamic acid solution, at 1004. The polyamic acid droplet is then processed, at 1006, to form a polyamic acid bead having an exterior wall enveloping an interior region. Finally, at 1008, the methods conclude, at least for this stage of fabrication, by thermally imidizing the bead to form a compressible polyimide bead having a high-density, imidized exterior wall and a low-density interior region. It should be noted that the polyamic acid droplet may be a literal droplet formed by dropping polyamic acid from a nozzle or may be a substantially spherical shaped object formed of polyamic acid in aprotic solvent. The primary difference between the polyamic acid droplet and the polyamic acid bead is that the bead is processed, such as at step 1006, to concentrate the polyamic acid, to partially imidize the polyamic acid, or to otherwise result in an object having an exterior wall enveloping an interior region. As will be seen in the discussion below, the present methods and systems may process the polyamic acid droplet in a variety of manners; the processing step in FIG. 10 represents the various manners in which the polyamic acid droplet is prepared for the imidization step at 1008.

The methods 1000 may be applied using a variety of polyamic acids in a variety of aprotic solvents. In fact, the step of obtaining a solution of polyamic acid in an aprotic solvent may include obtaining a solution of multiple polyamic acids in one or more aprotic solvents. Moreover, while the polyamic acid is in solution with aprotic solvents, a variety of other components may be in solution. Accordingly, the solution need not be limited to a pure solution of a polyamic acid in an aprotic solvent. Exemplary polyamic acids include aromatic polyamic acids selected from biphenyl dianhydride-oxydianiline (BPDA-ODA), biphenyl dianhydride-para-phenylene diamine (BPDA-PDA), and mixtures thereof. BPDA-ODA is commercially available in film form as UPILEX®-R and BPDA-PDA is commercially available in film form as UPILEX®-S; each is available from Ube Industries. Ube Industries also makes available a varnish containing the polyamic acids in solution.

Exemplary aprotic solvents that may be used to form the polyamic acid solution include n-methyl-2-pyrrolidone (NMP), dimethylformamide (DMF), dimethylacetamide (DMAC), dimethyl sulfoxide (DMSO), (Tetrahydrofuran) THF, and mixtures thereof. The aprotic solvent functions primarily to dissolve the polyamic acid(s) in solution. The aprotic solvent may be selected based in part on the ability of the aprotic solvent(s) to dissolve the selected polyamic acids under the desired conditions. For example, as will described in greater detail herein, the polyamic acid solution is formed into a droplet through a variety of means. The ability of the aprotic solvent to form such a droplet may influence the selection of a particular aprotic solvent. For example, the surface tension of the aprotic solvent may be relevant in the fluid's ability to form a droplet. Similarly, the remaining process steps may influence the selection of the aprotic solvent. In some implementations, a blend of aprotic solvents may be preferred to provide different functional benefits at different stages of the presently disclosed fabrication process. While the aprotic solvents identified above may be preferred, other aprotic solvents may be used.

As discussed above, exemplary polyamic acids used in the present methods are commonly available as prepared solutions with the polyamic acid in an aprotic solvent. While commercially available varnishes may be used in the present methods, the polyamic acids may be obtained through chemical reactions using suitable precursors and reactions. The available precursors and reaction pathways available to produce a polyamic acid are numerous. Moreover, it is well understood that the selection of particular precursors and/or the selection and control of the reaction pathways can result in dramatically different properties for the polyamic acid and the resulting polyimide. Accordingly, the solution of polyamic acid in an aprotic solvent may be obtained in any suitable manner. In some implementations, the polyamic acid solution may be obtained as a varnish, such as from a vendor, at one concentration or as a given composition. The obtained varnish may then be modified to become suitable for the present methods. For example, two or more varnishes may be blended to provide a mixture of polyamic acids in solution. Additionally or alternatively, the varnish or obtained polyamic acid solution may be too viscous for the instruments of the specific implementation (in which case the solution could be thinned by additional aprotic solvent). In some implementations, the polyamic acid solution comprises greater than about 5 wt % polyamic acid (total polyamic acid when multiple polyamic acids are used) and less than about 20 wt % polyamic acid. The higher concentration may facilitate subsequent method steps, such as the imidization step or the drying steps, but may complicate other subsequent steps, such as forming a droplet of the polyamic acid solution.

Preferably the obtained polyamic acid solution is selected to provide the polyimide beads with the properties described herein, such as the mechanical properties and dimensions discussed above. While the exemplary polyamic acids described above (Upilex-S, Upilex-R) may be selected and imidized to provide these properties, other suitable polyamic acids may be identified as well. Additionally or alternatively, the properties of the resulting polyimide bead may be enhanced or modified through the inclusion of one or more additives. For example, the tensile strength, impermeability, plasticity, elasticity, and/or other properties may be improved by additives added to the polyamic acid solution prior to forming the droplet or to the droplet or bead at later stages. Exemplary additives may include nano-fillers, meso-fillers, and/or macro-fillers of various configurations and sources. The filler materials may be selected to increase the tensile strength of the polyimide bead, to alter the permeability of the polyamic acid droplet or bead, or to provide other benefits, such as higher stiffness/modulus, reduced liquid, gas and vapor permeability, enhanced thermal stability, reduced compressibility tendencies, improved heat distortion temperature and flame retardation, improved toughness, and/or enhanced dynamic mechanical properties. For example, the nano-fillers may include nano-clays (e.g., montmorillonite, saponite, hectorite, etc.), nano-inorganic particles (e.g., $CaCO_3$), and nano-organic particles (e.g., carbon nanotubes), and mixtures of such particles. Exemplary meso-fillers and macro-fillers include chopped glass fiber, fiber glass, carbon fibers, alumina fibers, and mixtures of the same. The filler materials may be incorporated into the obtained polyamic acid solutions to be present in the imidized bead. The manner and degree to which the fillers affect the final permeability and mechanical properties of the compressible polyimide beads may depend on a number of factors, including filler size, filler size distribution, filler surface chemistry, filler surface functionalization, filler volume fraction, filler mixture compositions and concentrations, degree of filler dispersion, degree of clay exfoliation (when clay is used), aspect ratio of the fillers, degree of orientation etc. Other functionalized and unfunctionalized fillers, filler concentrations, etc. are within the scope of the present invention including inorganic and organic-based nano-, meso-, and macro-fillers such as carbon fibers, alumina, milled glass fibers, carbon black, zeolites, silica, mica, sol-gel produced fillers, layered silicates, organo-clays, fluoromica, hydrotalcites, colloidal silica, cellulose fibers, polyamide fibers, liquid crystal fibers, aromatic-based fibers, polyhedral oligomeric silsesquioxanes, silane functionalized fillers, phosphate based fillers, crosslinked polymeric particles/fillers, ionomers, wood fibers, aluminum hydroxide, calcium hydroxide, lignin fillers and fibers, carboxylate fillers (e.g., lead carboxylate), Kevlar pulp, cellulose triacetate, silica and black rice husk ash fibers, crosslinked and uncrosslinked latex particles, crosslinked and uncrosslinked dispersion polymerization produced particles, crosslinked and uncrosslinked emulsion polymerization produced particles, and mixtures thereof.

Additionally or alternatively, exemplary additives to the polyamic acid solution may include one or more plasticizers. The plasticizer(s) may be selected to change the elasticity of the droplets or beads, such as to allow them to be shaped and reshaped during the fabrication process or to allow them to better withstand the strains and stresses during use in hydrocarbon recovery operations. Various plasticizers and their properties and effects are well known; any one or more of these plasticizers may be incorporated into the present polyimide beads, such as by adding the plasiticizer(s) to the polyamic acid solution. The plasticizer may be selected to increase the transition temperature of the polyimide bead (such as to endure higher temperatures downhole). Additionally or alternatively, the plasticizer may be selected to decrease the stiffness of the polyimide bead, to increase the ability of the polyimide bead to compress or expand uniformly, to increase the ability of the polyamic acid solution to form the polyamic acid droplet or bead uniformly, to increase the ability of the polyamic acid solution to form the polyamic acid droplet or bead without cracking, or to provide any combination of these exemplary benefits or properties or other benefits or properties.

While various plasticizers may be utilized, there are many factors that may guide the selection of the plasticizer and the manner in which the plasticizer is incorporated. For example, the solubility of the plasticizer in the polyamic acid, the polyamic acid solution, the polyamic acid droplet, and the polyamic acid bead during the various processing steps may control the selection of the plasticizer. As a simple example, a plasticizer that is extracted from the polyamic acid droplet during the non-solvent extraction steps will have limited effect on the final polyimide bead. Additionally or alternatively, the ability of the various available plasticizers to provide one or more of the above-referenced benefits, the relative importance of the above-referenced benefits, and the relative concentrations of the plasticizer required to obtain the benefits may guide the selection and quantity of plasticizer to be incorporated.

It should be noted that the plasticizers may be considered for their tendency to affect the imidization reaction and the final properties of the imidized beads. Depending on the intended purpose of the plasticizer, which may include adapting the properties of the polyamide droplet/bead and/or adapting the properties of the resulting polyimide bead, the plasticizer may be selected for its ability to be removed from the polyamic acid droplet during the fabrication process. For example, some implementations may incorporate a plasticizer for strengthening the polyamic acid droplet for impact with the non-solvent solution bath and/or for expansion of the polyamic acid bed by a volatile, internal blowing agent. In such implementations, it may be desirable to remove the plasticizer from the polyamic acid bead before beginning the imidization reaction, particularly if the plasticizer is expected to affect the imidization reaction or the final imidized bead.

Moreover, without being bound by theory, it is presently believed that the structure of the plasticizer may determine the effectiveness and efficiency of the plasticizer in providing the above-referenced benefits. Accordingly, the selection of plasticizers may be guided by structural similarities between the various plasticizers. An exemplary, non-limiting list of plasticizer materials to be considered for incorporation in the present methods includes various aprotic solvents, carboxylic acids, various amines, toluene, styrene, alpha-methylstyrene, oligomeric polystyrenes, aromatic and aliphatic oils, and other aromatic and aliphatic compounds.

It can be understood from the foregoing that the polyamic acid solution can be obtained in a variety of suitable manners and that the solution may contain one or more polyamic acids with or without additives, such as plasticizers and/or fillers, in an aprotic solvent. Returning to FIG. 10, it will be recalled that the methods 1000 continue by forming a droplet of the polyamic acid solution, at 1004. The droplet may be formed in a variety of manners using a variety of instruments. In the simplest form, a droplet may be formed from an eye-dropper or pipette-type instrument, such as when forming beads on a lab-scale. In other implementations, the droplet may be formed using a needle or other larger-scale instrumentation. In still further implementations, such as discussed herein, the polyamic acid droplet may be formed through systems and methods divergent from nozzles and pipettes.

As discussed above, FIG. 10 illustrates a high-level explanation of the methods and systems described and claimed herein. Once the polyamic acid solution is processed into a polyamic acid bead, the polyamic acid bead is imidized following an imidization strategy, at 1008. The processing steps may be according to any of the following descriptions and are adapted to prepare the polyamic acid bead for imidization. The imidization strategy may be according to guidance provided by the manufacturer of the polyamic acid or polyamic acid varnish. Additionally or alternatively, the temperatures and/or times and/or may be varied depending on the intended utility of the beads. Exemplary imidization steps 1008 may include a series of heating steps staged over time to cure or thermally imidize the polyamic acid in the desired manner to provide it with the desired mechanical properties. The thermal imidization may utilize an autoclave or other systems adapted for high temperatures. Autoclaves may be particularly preferred in light of their ability to withstand high temperatures and high pressures and due to the relatively ready scalability.

As described in several of the prior publications incorporated herein regarding the use of compressible objects in downhole environments, such compressible objects may preferably be pressurized so as to resist compression until reaching a predetermined depth in the well being drilled. Stated otherwise, during the drilling or other hydrocarbon recovery operation, it may be preferred to provide beads having a diversity of properties. Particularly, it may be preferred to provide beads adapted to compress under predetermined conditions, with different beads compressing to different degrees under different external conditions. Different batches of polyamic acid beads may be provided with different compressibility properties by varying the structural or mechanical properties of the final polyimide bead. For example, the wall thickness, the diameter, the choice of polyimide, etc. could be varied to provide different mechanical properties. Additionally or alternatively, the structural properties may be varied, such as by providing a hollow interior region, varying the size of the hollow interior region relative to the wall thickness, varying the properties of a foamed interior region, etc.

In some implementations, it may be desirable to have the final imidized polyimide bead contain a pressurized internal gas, which may be compressible or incompressible. The polyamic acid beads may be pressurized during the imidization stage 1008. In exemplary implementations, the polyamic acid beads may be permeable to gases, such as nitrogen, or gas mixtures having that have a molecular size sufficiently small to penetrate the wall of the polyamic acid bead. Preferably, the gas should also have limited interaction with the aprotic solvent and the polyamic acid. Accordingly, the polyamic acid beads may be disposed in the autoclave and gas may be pumped into the autoclave. The autoclave may be pressurized to pressures between about 20 psi to about 4000 psi. The heating for thermal imidization may begin while the pressure is increasing or may begin after the autoclave is pressurized to a predetermined pressure. In some implementations, the increase in the internal pressure of the polyamic acid beads may lag behind the increasing pressure of the autoclave itself, the imidization rate may intentionally lag behind the increasing pressure of the autoclave. The autoclave operation, including pressurizing and heating, may be adapted to trap a desired internal pressure within the beads by way of the imidization reaction. The polyamic acids and the methods of the present disclosure are adapted to provide an exterior wall that is substantially impermeable to the gases trapped inside, even at pressures exceeding 4000 psi. Accordingly, if the imidization reaction proceeds ahead of the pressurizing rate, the polyimide bead will have insufficient interior pressure. Similarly, in the interest of process efficiency, it would be impractical to maintain the autoclave at elevated pressures longer than necessary. Depending on the polyamic acid(s) selected and the desired properties of the final polyimide beads, the pressurizing schedule and the heating schedule may vary.

As an illustrative description of an exemplary thermal imidization stage 1008, an example of a pressurizing and heating routine is provided here. The polyamic acid beads may be placed in an autoclave and heated over about 7-9 minutes to about 115-125° C., which temperature is held for about 50-70 minutes. The autoclave is then heated to about 145-155° C. over about 2-4 minutes and held at that temperature for about 20-40 minutes. The autoclave is then heated to about 195-205° C. over about 2-4 minutes and held at that temperature for about 5-15 minutes. The autoclave is then heated to about 245-255° C. over about 4-6 minutes and held at that temperature for about 5-15 minutes. Still further, the autoclave is heated over about 15-25 minutes to about 440-460° C., and held at that temperature for about 5-15 minutes, before cooling down to about 15-20° C. over about 75-80 minutes.

The foregoing discussion of FIGS. 1-10 sets the stage for much of the following discussion of the various manners of processing the polyamic acid droplet into a polyamic acid bead ready for imidization. Variations to the above description may be understood or made more suitable depending on the particular implementation of the processing step 1006 of FIG. 10. The following sections of the present disclosure provide a description of several manners of processing the polyamic acid solution droplet to provide a polyamic acid bead. Additionally, several examples of aspects of the present systems and methods are provided below.

Non-Solvent Extraction Systems And Methods

Figure 11:
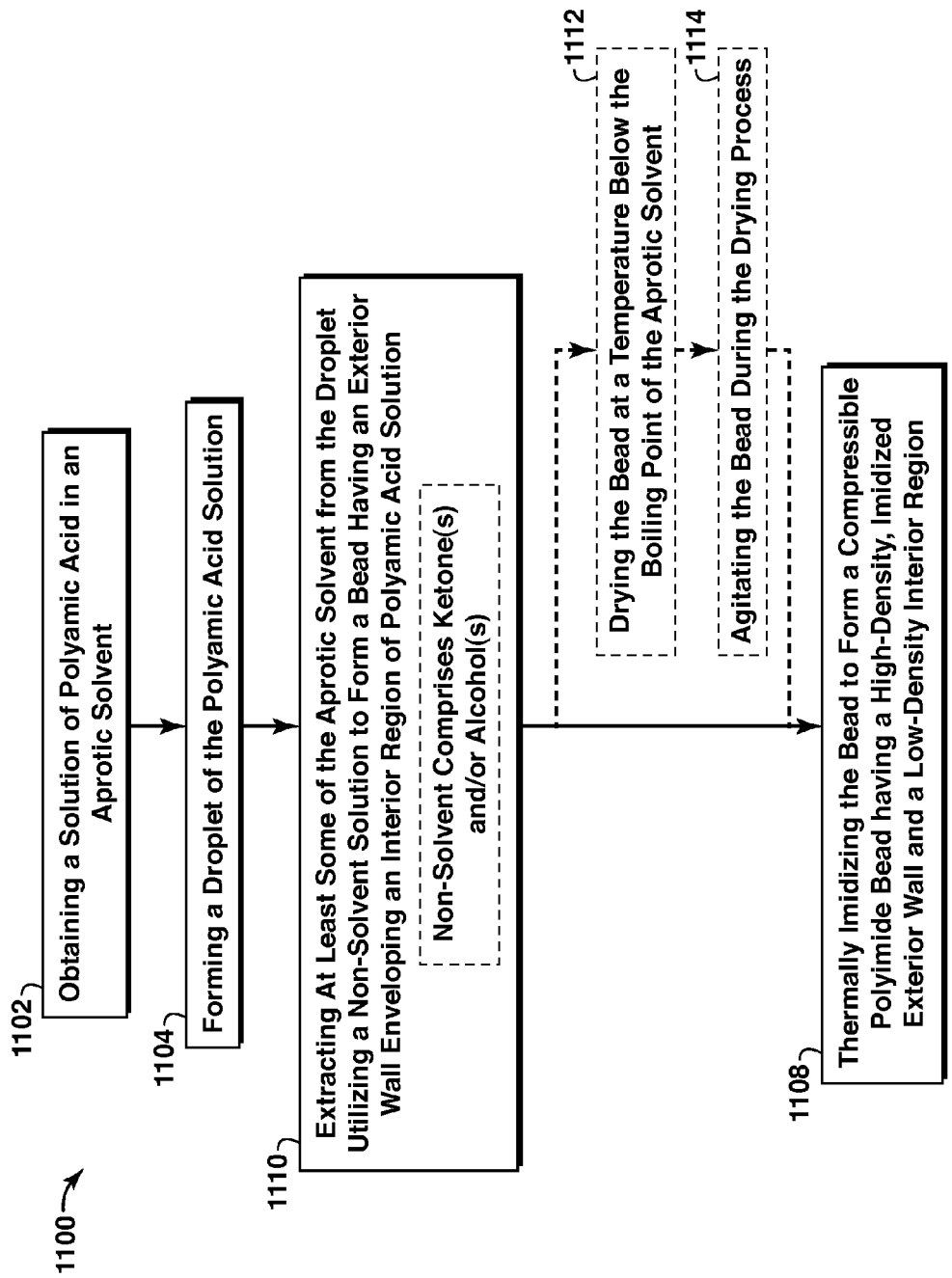
FIG. 11 is a generalized flow chart of methods similar to those of FIG. 10 and utilizing non-solvent extraction to form the polyamic acid bead from the polyamic acid droplet.

FIG. 11 provides a schematic flow chart 1100 similar to that shown in FIG. 10, but highlighting one manner of processing the polyamic acid droplets to form polyamic acid beads. Particularly, FIG. 11 illustrates the steps involved in using non-solvent extraction principles to concentrate the polyamic acid solution into an exterior shell or to otherwise extract some of the aprotic solvent. As seen in FIG. 11, boxes of the flow chart are numbered in a manner corresponding to that of FIG. 10. However, the processing step 1006 has been more explicitly illustrated, at box 1110, as extracting at least some of the aprotic solvent from the droplet utilizing a non-solvent solution. The extraction proceeds to form a bead having an exterior wall enveloping an interior region of polyamic acid solution. FIG. 11 further illustrates an optional drying step 1112 and an agitation step 1114 that may be implemented as part of the processing step 1006 of FIG. 10.

The following discussion of non-solvent extraction methods utilizes a drop-tower type configuration for forming the polyamic acid droplets, step 1104, primarily for the convenience of having a fixed system for discussion purposes. However, it should be understood that the non-solvent extraction methodology for forming the beads from the droplets may be implemented regardless of the manner for forming the polyamic acid droplets. Similarly, it should be understood that the drop tower system may be used with other processing step implementations described herein. A generalized description of a drop tower system for forming polyamic acid droplets is provided here as an exemplary manner of forming polyamic acid droplets. Other systems may be implemented by adapting the principles described here. For example, scale-up operations may identify other systems that may be more efficient in producing high quantity and quality droplets for processing. Such adaptations are within the scope of the present disclosure.

In some implementations, the droplet forming instrument may include or be coupled with a pressurized source of polyamic acid solution. For example, a continuous stream of polyamic acid solution may be pumped through a nozzle (or plurality of nozzles) to produce droplets at a predetermined rate. The nozzle(s) and the flow rate may be adapted in light of the polyamic acid solution to cause the droplets to form naturally (due to the combinative effects of gravity and surface tension). In some implementations, the nozzle (or other instrument) through which the polyamic acid solution is formed into a droplet must be sufficiently large to suit the viscosity of the polyamic acid solution and still sufficiently small to form the desired droplet size. It can be appreciated that the precise dimension of the nozzle or other orifice used to form the droplet will depend heavily on the properties of the polyamic acid solution and the intended use of the compressible polyimide beads.

Depending on the expansion available during subsequent steps, such as by blowing agents discussed below, or shrinkage resulting from subsequent steps, such as the drying steps discussed below, the droplets formed in the present methods may be larger or smaller than the intended size of the final polyimide beads. It is presently believed that polyimide beads as small as 0.5 millimeters may be suitable in variable density muds. Additionally, it is presently believed that polyimide beads as large as 2-3 millimeters may be suitable. In some implementations, the final polyimide bead size will be influenced by the configuration of the pumps and equipment through which the beads must pass and/or by the compression ratios required to obtain the desired density change. Exemplary polyimide bead sizes were described above. The droplets formed in the present methods may have a diameter of less than about 500 microns, such as when the droplet will be expanded during processing steps. Additionally, droplets formed in the present methods may have a diameter greater than about 3000 microns, such as when the droplet will shrink through subsequent steps. More preferably, the polyamic acid droplets will have a diameter between about 1000 microns and about 2000 microns. The droplets may be formed as spheres or as spheroidal droplets having an aspect other than 1:1. Moreover, the droplets may be still more irregularly shaped. For the purpose of determining the size or diameter of the droplets, an operator may size and/or shape the polyamic droplets based on the desired final polyimide bead sizes and shapes. For example, polyamic acid droplets may be formed having an oblate spheroid geometry corresponding to a preferred geometry of the polyimide beads, such as those discussed above. Still additionally or alternatively, the droplets may be formed as spheres and then subjected to processing to shape the droplets before beginning the extraction step.

Additionally or alternatively, the droplet forming equipment may be adapted to facilitate the droplet formation, such as by shearing the droplet from the nozzle. Such shearing may be particularly relevant when a large nozzle or orifice is required due to viscosity constraints but a small droplet is required for the intended polyimide bead use. While cutting equipment could be implemented to shear the polyamic acid solution at consistent, predetermined intervals, gas streams may also be used to encourage shearing at consistent intervals. For example, a gas stream flowing around the outside of the nozzle and the forming droplet may apply sufficient additional pressure (in addition to gravitational forces) to cause droplet formation at predetermined intervals (or substantially at those predetermined intervals). The flow rate of the polyamic acid solution and the flow rate of the gas stream may be controlled or correlated to shear the polyamic acid solution stream into droplets of substantially uniform configuration, such as having predetermined size, shape, etc. A shearing gas stream may be preferred when the natural droplet size would be larger than desired and an external airflow could be implemented to result in smaller droplets. In some implementations, the gas of the external airflow may incorporate aprotic solvent to avoid prematurely dehydrating the forming droplet. For example, the gas of the external airflow may be saturated with the aprotic solvent of the polyamic acid solution (or with another aprotic solvent). Additionally or alternatively, the gas of the external airflow may be adapted to begin one or more subsequent process steps. For example, it may be preferred to begin drying or dehydrating the polyamic acid droplet to increase its structural integrity before impacting a non-solvent solution bath. In some implementations, the shearing gas stream may have a first composition, such as to facilitate droplet formation, and the droplet may be formed in an environment having a different composition or temperature, such as a drying chamber or dehydrating environment.

Figure 12:
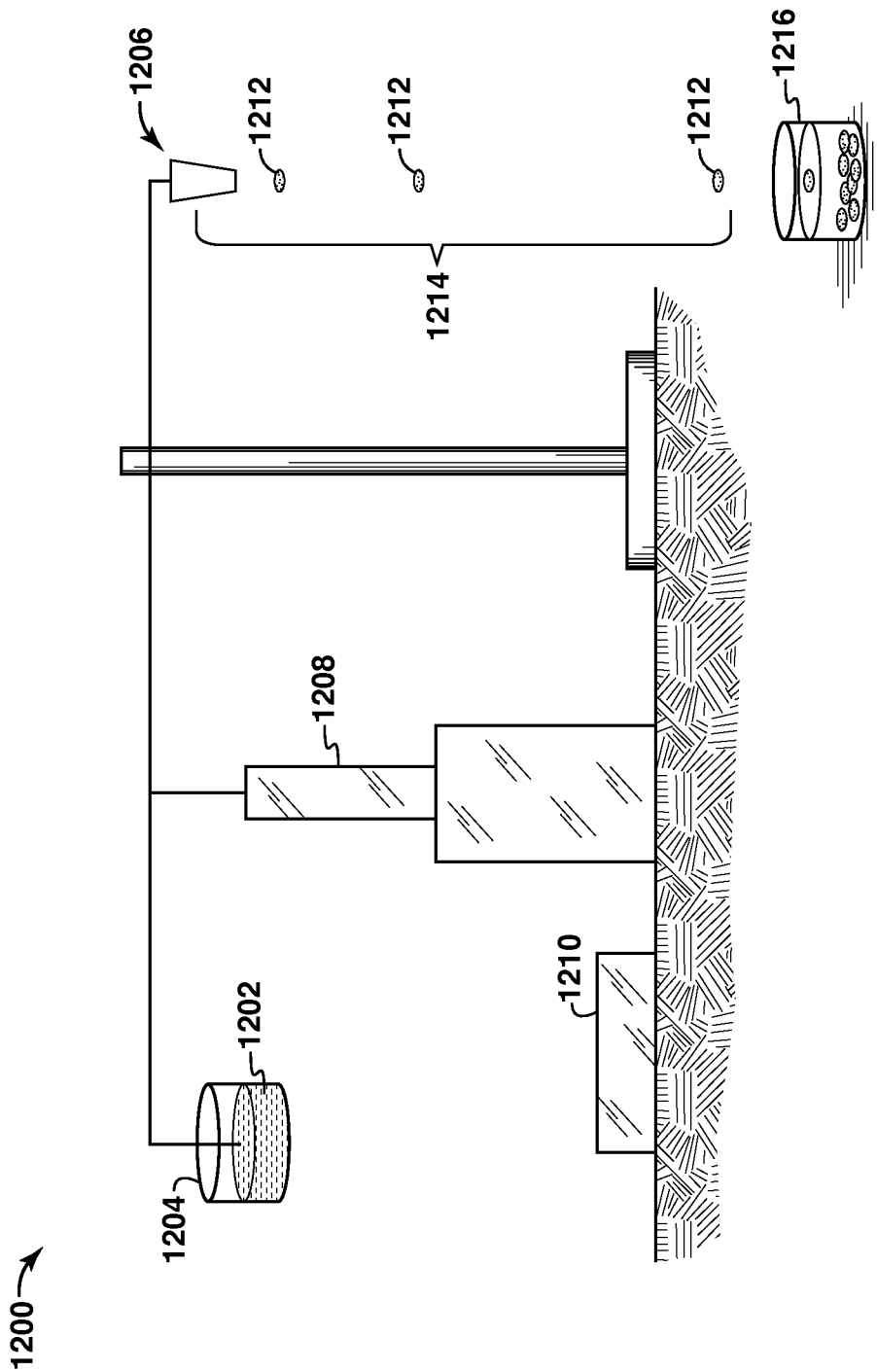
FIG. 12 is a schematic illustration of a system for forming polyamic acid beads.

FIG. 12 schematically illustrates an exemplary laboratory set-up 1200 for fabricating compressible polyimide beads. In the illustrated configuration, the polyamic acid solution 1202 is controllably pumped from a polyamic acid solution supply 1204 to a droplet forming instrument 1206 by way of a pump 1208 and a control unit 1210. The droplet forming instrument 1206 may be provided by any of the equipment described above (pipette, nozzles, needles, etc.) or other suitable equipment. While the set-up 1200 is illustrated as producing a single droplet 1212 at a time, it should be understood that this simplified schematic represents the variety of instruments that may be used. For example, an array of instruments could be assembled or configured to produce multiple droplets. Depending on the viscosity of the polyamic acid solution, the configuration of the droplet forming instruments, the size of the droplets desired, and a number of other factors, the flow rate of the polyamic acid solution can vary widely, as can the number of droplets formed per unit of time. The Examples section of the present application includes examples of various flow rates and droplet formation rates for the implementations described therein. However, the specific implementations described in the Examples section are merely illustrative and should not be considered limiting.

FIG. 12 schematically illustrates a droplet 1212 having a uniform composition. While such a droplet configuration is within the scope of the present invention, the droplets may further include a core material surrounded by the polyamic acid solution. For example, the droplet forming instruments 1206 may be adapted to form a polyamic acid solution droplet around a substantially centralized core of another material. In a relatively simple implementation, the droplet forming instruments 1206 may include a coaxial nozzle with the core nozzle flowing a gas (or other material) and the outer nozzle flowing the polyamic acid solution. The gas at the core of the droplet may result in a substantially hollow polyamic acid droplet. Additionally or alternatively, the core nozzle may flow a liquid that is more volatile than the polyamic acid. The volatile liquid may preferably be a nonsolvent to the polyamic acid so as to remain distinct from the polyamic acid solution. The lower boiling point of the volatile liquid may result in expansion of the core material during subsequent processing of the droplet. In some implementations, this expansion may be desirable to increase the size of the droplets and/or to thin the wall of the droplets. Accordingly, the core materials may be referred to herein as blowing agents. A variety of nonsolvent, volatile core materials could be flowed through the core nozzle; exemplary core materials are perfluorohexane, heptane, hexane and mixtures thereof. Without being bound by theory, it is presently believed that the general characteristics of the blowing agent are that it is essentially insoluble in the polyamic acid solution and has a boiling point below the thermal imidization temperature range of the polyamic acid.

It should be understood from the discussion thus far that at least three different flow streams may be utilized in the formation of the polyamic acid droplets: the polyamic acid solution flow stream; the core material flow stream; and the external gas flow stream. Depending on the implementation, the present methods may use a droplet formation instrument 1206 having one, two, or three flow streams. Such streams may be configured in any suitable manner, with coaxial configurations being preferred. Accordingly, when the droplet is formed using an external gas flow and a polyamic acid solution droplet (i.e., without an internal core material), a coaxial nozzle may be used having polyamic acid solution in the inner nozzle and gas in the outer nozzle. Similarly, when the droplet is formed having an internal blowing agent and a polyamic acid solution shell, a coaxial nozzle may be used with the blowing agent in the inner nozzle and the polyamic acid solution in the outer nozzle. By extension, when the droplet is formed using an external gas flow and an internal blowing agent, a tri-axial nozzle may be used. As can be understood from the discussion herein, the relative flow rates, viscosities, and other properties of the various streams through the nozzles may dictate the relative sizing and configuration of the nozzles. For example, in a tri-axial nozzle having a blowing agent stream, a polyamic acid solution stream, and a gas stream, the nozzle or conduit for the polyamic acid solution stream may be larger than the conduits for the other streams. Similarly, one or more of the conduits, or the entirety of the nozzle, may be shaped or configured to cooperate in the formation of the droplet. For example, the nozzle may include beveled edges to facilitate the formation of a rounded droplet. Additionally or alternatively, the wall materials used to define the conduits of the multi-axial nozzle may be shaped or otherwise treated to fit the purpose (e.g., may be beveled in one or two directions depending on the shapes and effects intended). As described above, the particular configuration of the droplet forming instruments 1206 may vary widely depending on the scale at which the droplets are being produced. While several exemplary nozzle configurations are described herein, the present invention is not limited to a particular nozzle configuration.

FIG. 12 illustrates the polyamic acid droplet falling through an air gap 1214 before entering a non-solvent solution bath 1216. The air gap 1214 may be adapted to suite the circumstances of the fabrication method. For example, different polyamic acid solutions and/or different non-solvent solution baths may suggest different configurations or adaptations for the air gap 1214. One example of a variation within the scope of the present invention is to enclose the air gap in tubulars or housings (not shown in FIG. 12) to provide greater control over the environment. As another exemplary variation, the air gap 1214 may be longer or shorter depending on a variety of factors. Exemplary lengths for the air gap 1214, when included, may range between about 2 inches and about 10 feet. In a relatively simple configuration, the air gap may be about 10 inches in length. Longer lengths may be preferred depending on the functional purpose of the air gap. In some implementations, the air gap 1214 may be adapted to begin a drying process to evaporate some of the aprotic solvent from the polyamic solution droplet. Inclusion of a preliminary drying step may be one reason for a somewhat longer air gap. Additionally or alternatively, some implementations may include an air gap 1214 adapted to provide the droplet time to form into a more sphere-like bead during the descent. Still additionally or alternatively, some implementations may be adapted to further assist in shaping the droplet. For example, the air gap may be adapted to provide the falling droplet with enough speed and/or force to be shaped upon impact with the non-solvent solution bath 1216, such as by flattening from a sphere to an oblate sphere, etc.

While FIG. 12 illustrates the air gap 1214 between the droplet forming instrument 1206 and the non-solvent solution bath 1216, the air gap is optional. In exemplary implementations, the droplet may be formed directly in a non-solvent solution bath. Still additionally or alternatively, it is possible to extract the solvent from the polyamic acid solution droplet in a non-solvent rich environment, rather than in a liquid bath as illustrated in FIG. 12. For example, the air gap 1214 may be an environment with gaseous non-solvent that interacts with a volatile aprotic solvent. Still further, the present methods may be adapted to shape the droplets using other apparatus between the droplet forming step and the imidization step.

With continuing reference to FIG. 11 and continuing with the discussion of the non-solvent bath 1216 of FIG. 12, the non-solvent extraction is implemented, in any of the manners discussed above, to extract at least some of the aprotic solvent from the polyamic acid solution droplet. Accordingly, the non-solvent bath 1216 is one example of a system adapted for the methods 1100 and particularly for the step 1110 of extracting aprotic solvent from the polyamic acid droplet. The extraction of the aprotic solvent results in the formation of a bead having an exterior wall enveloping an interior region. The exterior wall is not imidized at this point but is a concentrated band of polyamic acids. While the exterior wall at this stage is not rigid and only moderately weak interactions, if any, are formed between the individual molecules of polyamic acid, there is sufficient relationship between the polyamic acid molecules to form an exterior wall that can contain polyamic acid solution in the interior region. The exterior wall may have a thickness ranging from about 10 microns to about 300 microns, preferably between about 20 microns and about 200 microns, and more preferably between about 25 microns and 100 microns. The present inventions recognize that the thickness of the exterior wall at this stage may have a significant impact on the properties of the final imidized bead. For example, it is recognized that a thick exterior wall at this stage may reduce the compressibility of the final bead. However, an overly thin exterior wall may provide insufficient strength for the exterior wall of the bead and/or inadequate impermeability for the compressible polyimide beads. It is remembered that the beads fabricated according to the present methods are to be used downhole in hydrocarbon recovery operations where pressures and temperatures can be extreme. Accordingly, the mechanics of the polyamic acid beads and the resulting polyimide beads made through the present methods are important. Additional exemplary details regarding the mechanical properties and configurations were discussed above and the non-solvent extraction methods may be adapted in light thereof As described above, polyimides have been fabricated into a number of substantially 2-dimensional objects, such as films, fibers, and membranes, for a number of years. Non-solvent extraction of a solvent to leave a concentrated polyamic acid has been done in prior applications to form membranes or permeable materials. In these applications, the thin membrane, which is used to separate the components of a feed stream into various more pure component streams, is essentially mechanically supported by the underlying porous substrate. In those implementations, water was used as the non-solvent to extract the aprotic solvent. Water may similarly be used in the present methods to form compressible polyimide beads. When water is used to extract the aprotic solvent from the polyamic acid droplets described herein, the resulting polyamic acid bead has a foamed interior region and a thin exterior wall. The natures of the foamed interior region and the exterior wall are different, with the exterior wall being a more concentrated, dense structure than the interior region. While the beads formed using water have some desirable properties, the thin exterior wall and the foamed interior region may limit the compressibility of the beads, may affect the strength of the bead, or may otherwise limit the beads functionality in some downhole applications.

While water has been used historically, and may be used in the present methods, other non-solvents have been identified that allow greater control over the extraction process and that result in greater control over the configuration of the polyamic acid bead formed through the extraction. Without being bound by theory, it is presently believed that the non-solvent should be soluble or partially soluble in the aprotic solvent, but essentially a nonsolvent for the polyamic acid. Exemplary non-solvent solution baths may comprise ketone(s) and/or alcohol(s), alone or in combination with water. Exemplary ketones may include acetone, 2-butanone, 2-hexanone, and 2-octanone. Exemplary alcohols may include methanol and ethanol. While any one or more of these ketone(s) and alcohol(s) may be used alone, they may also be used together in different ratios to accomplish a desired effect. For example, a particular ketone may have a faster extraction rate than another and the two may be blended to provide a desired extraction rate between the two. By selecting a non-solvent having a controlled extraction rate, the present methods can be adapted to leave the polyamic acid droplet in the non-solvent solution bath for a predetermined time to accomplish a desired degree of extraction. For example, the extraction will begin at the interface of the droplet and the non-solvent solution. As the extraction continues, the aprotic solvent in the polyamic acid solution in the interior of the droplet is extracted. By pulling the partially extracted beads from the non-solvent solution bath before the entire interior region is extracted, the exterior region of the bead forms a distinct exterior wall enveloping an interior region still having a polyamic acid solution therein. The selection of the non-solvent(s) and the time in the non-solvent allows an operator control over the thickness of the wall and the nature of the wall (e.g., different non-solvents may concentrate the polyamic acids to different degrees). Detailed examples of various non-solvent solutions and bath times are provided in the Examples section below. The bead morphology (i.e., wall structure and thickness, and interior structure) resulting from these treatments is dependent upon the nature of the nonsolvent or nonsolvent mixture, temperature of the nonsolvent bath, time in which the bead is immersed in the nonsolvent bath as well as the degree of agitation.

As can be understood from the foregoing description, the present methods are not limited to particular non-solvent solution compositions or to particular residence times in the non-solvent solution bath. Rather, the polyamic acid droplet (or bead as it is transitioning between the droplet and bead configurations) may have a residence time in the non-solvent solution based on the selection of the non-solvent solution. The relationship between the two has been explained above. In some implementations, the residence time and/or the non-solvent solution may be adapted to form an exterior wall having a thickness between about 10 microns and about 300 microns. In some preferred implementations, the wall thickness will be between about 20 microns and about 200 microns, more preferably between about 25 microns and about 100 microns. While a particular wall thickness may be preferred in some implementations, the desired wall thickness may be related to a preferred diameter-to-thickness ratio. The diameter-to-thickness ratio may have an impact on the compressibility of the final polyimide bead. For example, a thicker wall occupies spaced that would otherwise be available for compression of the polyimide bead. Additional exemplary details regarding the thickness and the diameter-to-thickness ratio are provided below in the discussion of the mechanical configurations and properties. In some implementations, the residence time and/or the non-solvent solution composition may be selected to form an exterior wall having a desired thickness. By way of introduction and not limiting the discussion below, exemplary wall thickness may be selected to provide the final compressible polyimide bead with a diameter-to-thickness ratio between about 20 and about 50, more preferably the diameter-to-thickness ratio may be greater than 35.

Figure 13:
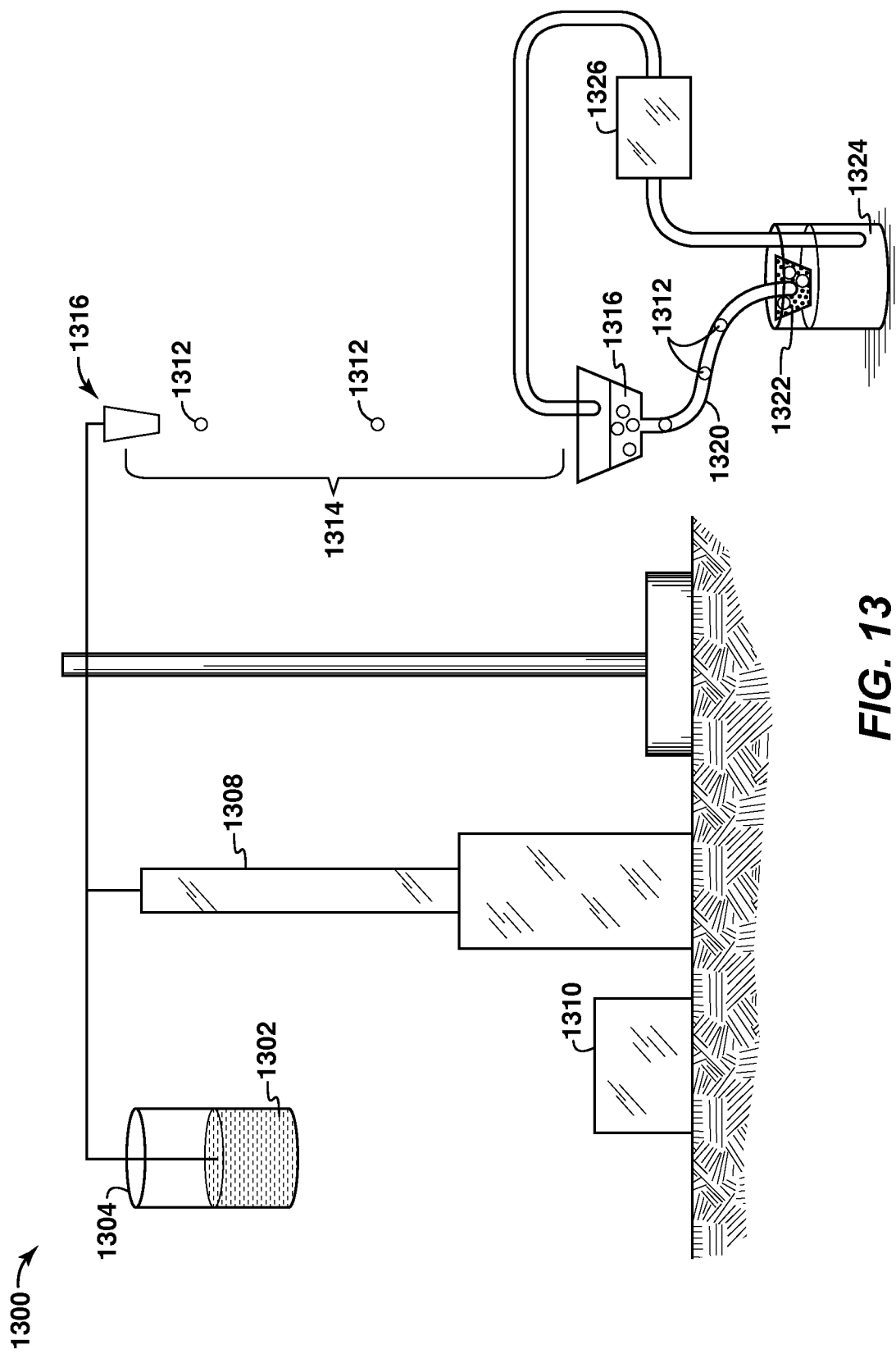
FIG. 13 is a schematic illustration of a system for forming polyamic acid beads.

FIG. 13 provides another schematic illustration of a suitable lab-scale set up 1300 for fabrication of polyamic acid droplets and beads. The systems and methods illustrated in FIG. 13 are substantially similar to the systems and methods of FIG. 12. Accordingly, similar features are referenced by the related numerals. As in FIG. 12, various apparatus, such as pumps 1308 and controllers 1310 cooperate to move a polyamic acid solution 1302 to a droplet forming instrument 1306. Moreover, similar to FIG. 12, the polyamic acid droplet 1312 falls into a non-solvent solution bath 1316. While FIG. 5 illustrated a non-solvent solution bath 1216 as a single reservoir in which the droplets collect, FIG. 13 provides one example of an adaptation, even at the lab-scale, to make the systems and methods more suitable for scale-up. In FIG. 13, the polyamic acid droplets 1312 are placed or allowed to fall into the non-solvent solution bath 1316. The droplets 1312 are then caused to flow through a tubular 1320 to a catch basin 1322. The length of the tubular and the flow rate of the fluid and droplet through the tubular may be adapted to provide the droplets with the desired residence time in the non-solvent (such as described above). The catch basin 1322 may be adapted to retain the formed beads for a period before moving as a batch to the next steps in the methods. Additionally or alternatively, the catch basin may be adapted to cause the beads to move yet again to an automated system that moves the recently formed beads to the remaining process steps. In the schematic of FIG. 13, the catch basin 1322 drains the non-solvent solution into a non-solvent source 1324, which is then pumped, by pump 1326, to be part of the non-solvent solution bath 1316. The simple recycle of the non-solvent solution is an example of the various efficiencies that can be added to the present systems. Various analogous modifications can be made for efficiency sake and are within the scope of the present invention.

Figure 14:
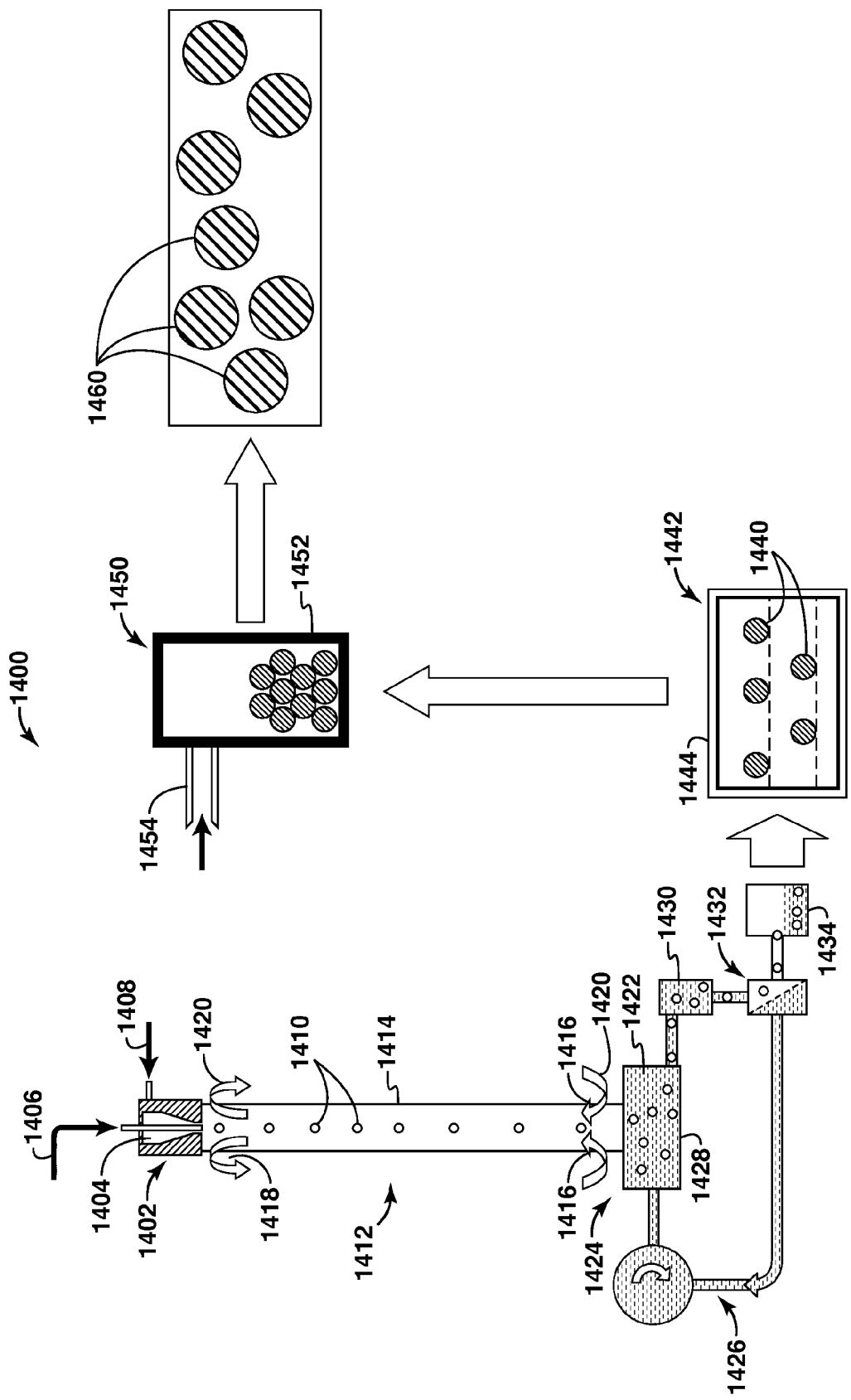
FIG. 14 is a schematic illustration of a system for forming polyimide beads.

Returning to the overview of FIG. 11, after extracting at least some of the aprotic solvent, the methods herein continue by thermally imidizing the polyamic acid bead to form a compressible polyimide bead having a high-density, imidized exterior wall and a low-density interior region. FIG. 14 schematically illustrates a more complete picture of a lab-scale system for fabricating the polyimide beads of the present disclosure. While the schematic representation of FIG. 14 is on a lab-scale, it illustrates principles and equipment that can be scaled-up or otherwise adapted for larger-scale production. Accordingly, FIG. 14 illustrates a schematic polyimide bead fabrication system 1400 that aids in understanding the methods of FIG. 11. While the system 1400 of FIG. 14 is exemplary, it is presented in schematic form to emphasize its non-limiting, exemplary nature. The methods of FIG. 11 may be performed by any variety of equipment combinations.

The bead fabrication systems 1400 include droplet forming equipment 1402. The droplet forming equipment 1402 of FIG. 14 is illustrative of an exemplary coaxial nozzle 1404 having a polyamic acid solution flow stream 1406 and a gas flow stream 1408. The configuration illustrated is merely one manner of flowing two fluids coaxially; others are available. Similarly, as discussed above, tri-axial configurations can be developed by extension of these principles. The polyamic acid solution and the gas flow may be as described above. For example, the polyamic acid solution flow stream may comprise a polyamic acid in NMP solution and the gas flow may comprise NMP saturated air. Similarly, the droplet 10 formed by the coaxial nozzle 1404 may be according to any one or more of the descriptions provided herein.

FIG. 14 further illustrates an exemplary air gap 1412 provided as an enclosed chamber 1414. The enclosed chamber 1414 is adapted with air inlets 1416 and outlets 1418 for circulated heated air 1420 through the chamber. The heated air may operate to begin drying the droplets (e.g., evaporating some of the aprotic solvent), which may begin concentrating the polyamic acids in the exterior regions of the droplets. The droplets 1410 then fall into the non-solvent solution 1422 in the non-solvent solution bath system 1424. The non-solvent solution bath system 1424 is similar to the non-solvent solutions of FIGS. 12 and 13 in function (e.g., to extract the aprotic solvent forming a polyamic acid bead having an exterior wall and an interior region) but includes some additional elements. As illustrated, the non-solvent solution bath system 1424 includes a recycle loop 1426. The recycle loop 1426 is adapted, in FIG. 14 to induce a flow or current in the initial bath 1428.

The current carries the droplets 1410 from the initial bath 1428 to a processing stage 1430 and on to a separation stage 1432. The processing stage may include a variety of steps and/or elements adapted to process the polyamic acid bead before imidization begins. Among the processing steps that may be conducted in the processing stage 1430 are steps such as shaping the polyamic acid bead to the desired form before imidization, heating the polyamic acid bead to draw still further aprotic solvent from the bead, heating the polyamic acid bead to expand a volatile material disposed in the core of the polyamic acid bead, etc. In the case of expanding the volatile core material, the processing stage 1430 at this point in the process (i.e., before imidization begins) may be implemented to allow some or all of the vaporized core material to permeate through the forming exterior wall.

The separation stage 1432 may be configured in any suitable manner to separate the polyamic acid beads from the non-solvent solution 1422 that is recycled back to the initial bath 1428. The separation stage 1432 may be a simple separation primarily focused on quickly moving the beads in the right direction without concern for the degree of separation between the beads and the non-solvent solution. Alternatively, the separation stage 1432 may include any variety of separation equipment adapted to recover as much of the non-solvent as possible. Still further variations may include separation equipment adapted to filter out polyamic acid beads not meeting certain criteria, such as size, density, etc.

FIG. 14 further illustrates that the non-solvent extraction may be quenched in some implementations to maintain still tighter controls on the extraction, such as by use of a quenching stage 1434. As discussed above, the extraction preferably may be controlled to obtain a desired exterior wall thickness relative to an un-concentrated, or un-extracted, interior region. The quenching stage 1434 may be a water bath or a water rinse adapted to rinse the non-solvent from the surface of the beads. As discussed above, water is a power non-solvent itself so the time in the quenching stage is limited and followed by a drying stage to remove the water. While water may be used in the quenching stage 1434, other fluids may similarly be used. For example, common solvents such as acetone may be used to rinse away the non-solvent. The low boiling point of acetone and low solvency in the common aprotic solvents may make it an effective quenching agent. Other examples of fluids or methods that can quench the extraction by removing the non-solvent from the polyamic acid bead can be identified (e.g., rinsing processes, conventional solvent extraction processes, conventional non-solvent extraction processes, Soxhlet extraction processes, liquid-liquid extraction processes, rinsing-vaporization processes, gas-liquid extraction processes, etc.).

From the quenching stage 1434, the polyamic acid beads 1440 (the droplets 1410 having been converted to beads by virtue of having a concentrated exterior wall), are moved to a drying stage 1442. As illustrated in FIG. 11, the drying stage 1112 is optional in the present methods. Depending on the implementation of the prior steps and the desired properties of the imidized bead, the drying stage 1442 may assist in preparing the polyamic acid bead to become the polyimide bead. As suggested previously, there may be a preliminary drying as part of the quenching stage 1434, which is distinct from the drying stage 1442. The drying stage 1442 may include a tumble dryer 1444 or other drying apparatus. The tumble dryer 1444 is illustrated because of its relatively easy scalability; however, other drying apparatus are recognizably available and suitable for the purpose of the drying stage.

The drying stage 1442 is adapted to dry the polyamic acid bead(s) at a temperature below the boiling point of the aprotic solvent, which is shown at 1112 in FIG. 11. The temperature may be selected depending on the rate of drying desired. Excessively fast drying may result in a foamed inner region, may begin imidizing the exterior wall prematurely, or may otherwise affect the properties of the final polyimide bead. On the other hand, production efficiencies may push the drying stage to the fastest drying rate possible without adversely affecting the final polyimide bead. As indicated, the drying stage is optional in the present methods, but when it is implemented it is adapted to drive the polyamic acid in the inner region toward the exterior wall. By evaporating the aprotic solvent through the exterior wall, the polyamic acid is deposited on the inner surface of the exterior wall. The deposition of additional polyamic acids results in a thicker exterior wall or in an inner region having a larger hollow center. The polyamic acid added to the inner surface through drying may not imidize in a manner identical to that of the original exterior wall, resulting in an exterior wall and an inner region having a polyimide coating on the inner surface of the exterior wall and a hollow center.

Accordingly, it can be understood that the drying stage 1442 is adapted to remove aprotic solvent from the bead while preserving the permeability of the exterior wall so that the evaporating aprotic solvent can pass through the exterior wall. While static drying may accomplish this objective, it may be preferred to agitate the bead during the drying stage 1442, such as by using the tumble dryer 1444 or other suitable drying equipment, so as uniformly coat the interior of the exterior wall with the polyamic acid. The optional agitation of the beads during the drying stage is shown in FIG. 11 at 1114. In some implementations, the drying stage may continue for a time and/or temperature to remove or evaporate substantially all of the aprotic solvent from the exterior wall and from the interior region. The degree to which the aprotic solvent has been evaporated from the bead may be determined using principles of mass balance from the initial polyamic acid solution 1406 to the dried polyamic acid bead 1440.

The degree to which mass balance principles can be applied to determine the extent of aprotic solvent evaporation may depend on the configuration of the prior processing steps. It should be understood that after the drying stage the polyamic acid bead consists essentially of the polyamic acid present in the original polyamic acid solution 1406 (and any fillers or other compositions supplemented thereto) and any core materials that may have been added during bead formation. While the polyamic acid solution interacts with numerous fluids through the various stages of FIG. 14, the polyamic acid itself remains substantially unchanged (i.e., there are no intentional chemical reactions, or minimal reactions, in the method to this point that would affect the polyamic acid). However, due to the various heating and drying steps that may be implemented through the end of the drying stage 1442, imidization, whether intended or otherwise, may have begun at any one or more of these stages. For example, partial imidization may have begun as early as in the air gap region 1412, particularly when heated gas is passed through the enclosed chamber 1414. In some implementations, the partial imidization may be intentional to provide additional structural support to the polyamic acid bead during the remaining processing steps while preserving the permeability and shapability of the polyamic acid bead. As is well known, the imidization reaction produces water as a by-product, which water may have been evaporated off at any one of the prior stages. Accordingly, to the degree that partial imidization has occurred prior to or during the drying stage 1442, the mass balance principles may not enable a perfect determination of when the aprotic solvent is completely evaporated. Similarly, in implementations utilizing a vaporizing blowing agent, the mass balance calculations may depend on the permeability of the vaporized blowing agent. Nonetheless, an operator may adapt the drying process to remove as much as the aprotic solvent as possible or as much as is economically reasonable in light of optimizing the process and the final polyimide beads.

FIG. 14 further illustrates that the polyamic acid beads, either after the quenching stage 1434 or after the drying stage 1442, when implemented, proceed to the imidization stage 1450. As illustrated in FIG. 10 at 1008 and FIG. 11 at 1108, the methods 1100 include thermally imidizing the polyamic acid bead to form a compressible polyimide bead. The schematically illustrated system accomplishes this imidization stage 1150 with an autoclave 1152, though other equipment could additionally or alternatively be used. The autoclave 1152 may be preferred in some implementations due to its capacity for high temperatures and pressures and due to its scalability. In some implementations in which pressure is not an important factor, the thermal imidization may occur in other available heating equipment. Additional details regarding the thermal imidization stage were provided above.

Chemical Imidization Systems And Methods

The discussion above in connection with FIGS. 11-14 related to non-solvent extraction systems and methods provide one exemplary manner to prepare the polyamic acid droplet for thermal imidization. As described above in connection with FIG. 10 and rendered more clear through the discussion of FIGS. 11-14, the processing step 1006 of FIG. 10 is intended to prepare the polyamic acid for the thermal imidization. While direct thermal imidization of the polyamic acid solution may provide an imidized object, such approaches presently are not believed to provide a polyimide bead having the structural and mechanical properties desired for use in drilling operations. The non-solvent extraction methods described above illustrate that through controlled extraction, the polyamic acid can be concentrated in an outer shell leaving a more dense outer shell and a less dense inner region. While some implementations may provide even a hollow inner region, a loose foamed interior may be acceptable in some applications. This section of the application focuses on chemical imidization techniques implemented during the processing step 1006 of FIG. 10. While the various implementations of the processing step 1006 are described distinctly, it should be noted that they can be combined in various manners. As an introductory example, the presently described chemical imidization techniques may utilize principles from the non-solvent extraction techniques to further concentrate the polyamic acid, as will be described more fully herein.

Figure 15:
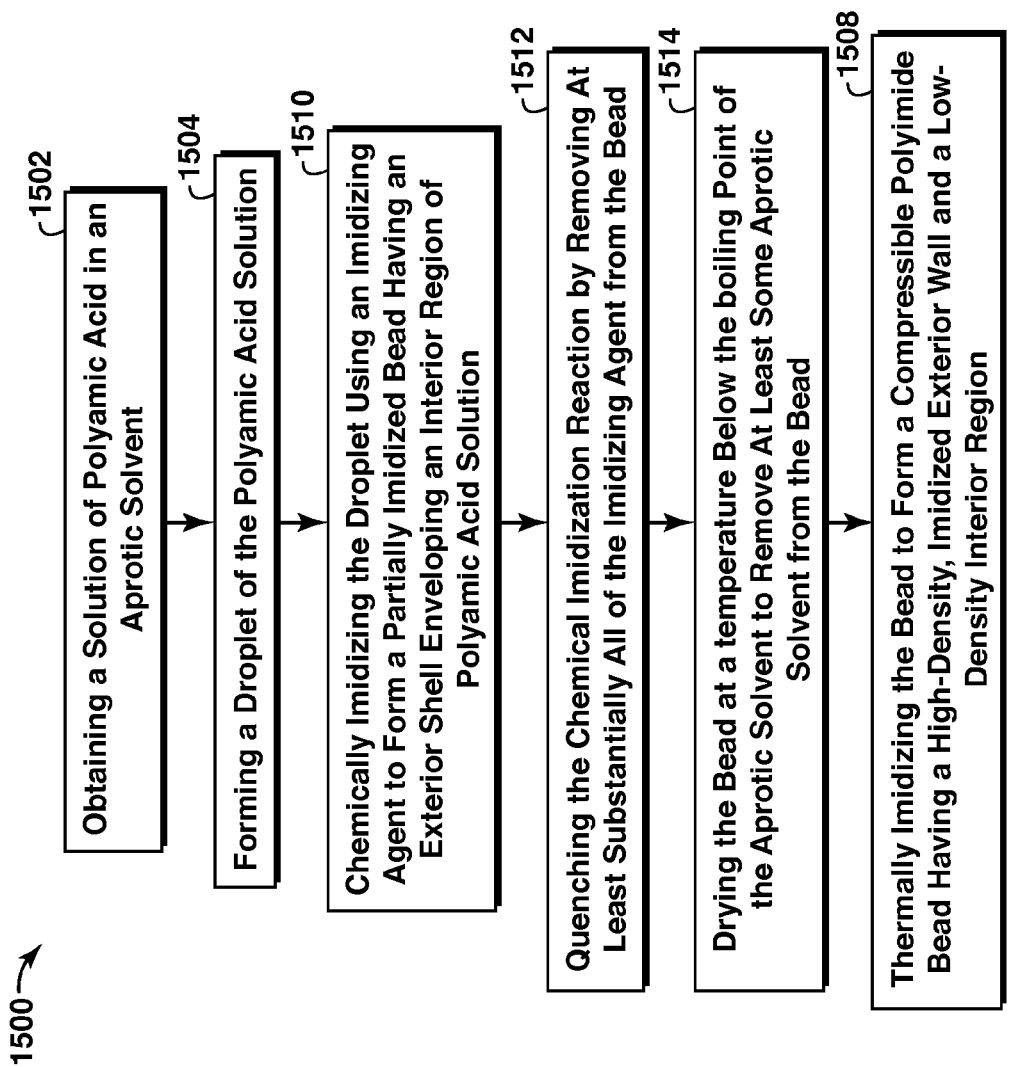
FIG. 15 is a generalized flow chart of methods similar to those of FIG. 10 and utilizing partial chemical imidization to form the polyamic acid bead from the polyamic acid droplet.

FIG. 15 provides a schematic flow chart similar to FIGS. 10 and 11 showing exemplary steps in methods of the present inventions. As illustrated in FIG. 15, the methods 1500 begin in the same manner as FIGS. 10 and 11. However, at box 1510, the chemical imidization implementations continue by chemically imidizing the polyamic acid droplet with an imidizing agent in a chemical imidization bath. Much like the non-solvent extraction implementations, the chemical imidization step 1510 is adapted to form a polyamic acid bead having an exterior wall enveloping an internal region. The methods 1500 continue by quenching the chemical imidization reaction by removing substantially all of the imidizing agent from the polyamic acid bead, at 1512, and by drying the polyamic acid bead to remove at least some of the aprotic solvent, at 1514. Finally, following the general pattern of FIG. 10, the bead is thermally imidized at 1508 to form a compressible polyimide bead having a high-density, imidized exterior wall and a low-density interior region. With FIG. 15 as an overview of the chemical imidization systems and methods, additional illustrative details will now be provided.

At the outset, it should be understood that the polyamic acid droplet formed at 1504 may be according to any aspect of the description herein. For example, the polyamic acid droplet may be formed using nozzles and drop towers as illustrated in FIGS. 12-14 or other such instruments as described above. Additionally or alternatively, the polyamic acid droplet may include an internal blowing agent as described above. Referring now to the chemical imidization step 1510, the exterior wall of the polyamic acid bead is partially imidized by the chemical imidization agent and the internal region is substantially as constituted by the droplet forming instruments. As can be understood, the chemical imidization agent begins acting on the exterior of the droplet and progresses inward at a rate dependent upon several factors. Accordingly, the thickness of the exterior wall and the size of the internal region may vary from implementation to implementation. While chemical imidization of polyamic acids has been done for other implementations and for fabrication of other polyimides, a controlled chemical imidization reaction as described herein is heretofore unknown. Conventional chemical imidization reactions typically utilize acetic anhydride and pyridine in the imidization bath. The pyridine acts as the imidization agent while the acetic anhydride primarily acts to capture the water produced by the imidization reaction.

While these conventional approaches may have functioned for chemical imidization of other polyamic acids or for other forms of polyimides, such methods were found to be ineffective for the present applications. For one, if the chemical imidization reaction is allowed to proceed unchecked, the polyamic acid droplet is converted to a polyimide bead without passing through the polyamic acid bead stage in which the polyamic acid, and therefore the polyimide, can be properly concentrated in an exterior wall. Moreover, it was found that polyamic acid droplets placed in a chemical imidization bath of pyridine required an excessively long residence time in the bath to form an exterior shell capable of manipulation and further processing. For at least these reasons, the present chemical imidization methods were developed. Specifically, the present methods 1500 include only partially chemically imidizing the polyamic acid droplet so as to form a polyamic acid bead having an exterior shell. The chemical imidization is kept at a partial stage by quenching the reaction at the proper time, as at 1512. Further, the chemical imidization methods of the present methods 1500 include further concentrating the polyamic acid by drying the bead at a temperature below the boiling point of the aprotic solvent to remove still more of the aprotic solvent, as at 1514. As with the non-solvent extraction implementations, the drying allows the polyamic acid solution in the inner region to be moved toward the exterior wall and to concentrate the polyamic acid molecules there leading to a dense outer wall and a less dense inner region. These steps, the partial chemical imidization, the timed quenching, and the drying to concentrate the polyamic acid molecules at the outer wall enable the present chemical imidization methods to produce polyimide beads suitable for the present applications.

The chemical imidization bath may comprise a variety of chemicals adapted to facilitate the partial chemical imidization. An exemplary imidization bath comprises an anhydride, a basic amine, and an aprotic solvent. The aprotic solvent may be the same as the aprotic solvent in the polyamic acid solution or may be a different aprotic solvent. Exemplary aprotic solvents include NMP (N-Methyl-2-pyrrolidone), DMAC (Dimethylacetamide), DMF (Dimethylformamide), DMSO (Dimethyl sulfoxide), THF (Tetrahydrofuran), and mixtures thereof. In some implementations it may be preferred to use an aprotic solvent that is different from the aprotic solvent of the polyamic acid solution in order to utilize the osmotic pressure differences between the aprotic solvent in the droplet and the concentration of that solvent in the imidization bath. The anhydride may be any suitable anhydride that is capable of capturing or 'dehydrating' the chemical imidization bath. As is well understood, the imidization reaction produces water as a byproduct. The anhydride present in solution may be selected based on an ability to bind this water byproduct, which may increase the reaction rate. Exemplary anhydrides include acetic anhydride, alkylated acetic anhydride, and mixtures thereof. The amine present in the chemical imidization bath constitutes the primary chemical imidization agent. Exemplary amines or chemical imidization agents include pyridine, DABCO, (1,4-diazabicyclo[2.2.2.] octane), triethylamine, and mixtures thereof. In exemplary implementations, the anhydride and the amine are present in stoichiometrically equimolar concentrations. Nevertheless, concentrations different from equimolar may be suitable in some implementations.

Continuing with the drop-tower system illustrated in connection with FIGS. 12-14, the polyamic acid droplet may be dropped or otherwise placed into the chemical imidization bath. In the interest of brevity and clarity, another schematic illustration is not provided nor deemed necessary. The schematic illustrations of FIGS. 12-14 provide sufficient reference for discussion of the chemical imidization systems. Particularly, FIG. 14 effectively illustrates an exemplary system in which polyamic acid droplets are in a bath, are subsequently processed, and are dried before being thermally imidized. The analogies between FIG. 14 and the chemical imidization methods should be apparent. In the chemical imidization systems, the polyamic acid droplet is allowed to reside in the chemical imidization bath for a predetermined time adapted to partially imidize an exterior shell to a degree sufficient to enable subsequent processing and handling. For example, the exterior shell should be sufficiently impermeable to retain the internal polyamic acid solution, yet still permeable to volatile aprotic solvent during subsequent drying steps. The exterior shell may be substantially thinner than the target wall thickness of the polyimide bead, with the thickness being based at least in part on the need to preserve the polyamic acid droplet shape and composition during the quenching and drying steps before thermal imidization. Depending on the composition of the polyamic acid solution and the chemical imidization bath, the residence time in the chemical imidization bath may vary. Exemplary times range from about 1 minute with an aggressive imidization agent to about 60 minutes with a slower imidization agent.

As described above and illustrated in FIG. 15, once the polyamic acid droplet is formed into a polyamic acid bead through partial imidization of the exterior wall, the chemical imidization reaction is quenched at 1512. The quenching may be effected as simply as rinsing the polyamic acid beads with water. In exemplary implementations, the quenching is effected with a solution that is a non-solvent for the polyamic acid, such as water. Other exemplary non-solvents were described above in the non-solvent extraction description and may be used here. For example, non-solvents adapted to extract the aprotic solvent from the polyamic acid bead while leaving the polyamic acid molecules in the bead may be preferred. As discussed above, aqueous solutions, ketones, alcohols, and mixtures thereof may be preferred. The quenching agent may be selected to draw the polyamic acid solution inside the exterior wall toward the exterior wall through relatively slow extraction through the permeable exterior wall, as compared to rapid extraction that would leave a foam in the inner region. The controlled extraction rate allows the polyamic acid molecules to migrate to the inner surface of the exterior wall. Exemplary non-solvent solutions comprise at least one of acetone, 2-butanone, 2-hexanone, 2-octanone, methanol, ethanol, and butanol. Other non-solvents may be used. Still further, additional quenching agents may be identified whose primary purpose is to rinse or otherwise remove the imidization agent from the polyamic acid bead.

Continuing with the description of the chemical imidization methods 1500 of FIG. 15, it can be seen that the presently described methods include, at box 1514, drying the polyamic acid beads at a temperature below the boiling point of the aprotic solvent to remove at least some of the aprotic solvent from the beads. Drying of the polyamic acid beads before thermal imidization was discussed above in connection with the non-solvent extraction methods. The present drying steps 1514 may be substantially similar, if not identical, in implementation. For example, the drying may be at a temperature and under conditions adapted to evaporate the aprotic solvent through the permeable exterior shell of the beads while coating the interior of the exterior shell with polyamic acid. Additionally, in some implementations, the beads may be agitated during the drying process to promote uniform or substantially uniform coating of the inner surface and uniform polyamic acid beads. As discussed above, a tumble dryer or other conventional drying equipment, with or with agitation features, may be used to implement the drying step. It should be noted that while specific equipment is not here identified for the imidization bath and quenching processes, it should be understood that a variety of systems could be developed using conventional equipment, the specifics of which would depend on the scale of the operation. As with the illustration of FIG. 14, a recycle loop is a simplified example of variations that may be implemented in commercial application of the present methods.

As with the discussion above in connection with the non-solvent extraction implementations, the drying may continue for a time sufficient to extract or evaporate at least some of the remaining aprotic solvent. Mass balance principles may be adapted to develop a formulaic approach for determining the proper drying time. Additionally or alternatively, suitable drying times may be developed empirically through the commercialization process. The objective in establishing a drying time is to dry the polyamic acid bead to reduce the density of the inner region, thereby increasing the compressibility of the bead, and to increase the thickness of the exterior wall of the polyamic acid bead. In some implementations, the bead wall thickness may have a preferred maximum size and a preferred minimum size, as discussed above. The drying stage may be operated to provide polyamic acid beads of the proper configuration (e.g., wall thickness).

With further reference to FIG. 15, the methods of the chemical imidization methods 1500 further include a thermal imidization step 1508. The thermal imidization step may be substantially the same as that described above and will not be repeated here in the interest of clarity. The thermal imidization methods may proceed together with pressurization of the polyamic acid beads until the beads become polyimide beads. Exemplary implementations of the chemical imidization methods are described in greater detail below in the Examples section. It will be seen that those Examples are within the scope of the methods described here. Further, it will be understood that the Examples are provided for illustration only and are not to be considered limiting.

Surface Coating Systems And Methods

The systems and methods described above for fabricating polyimide beads are believed to be suitable for scale-up and commercial implementation. Nevertheless, there are other potential methods for forming a polyimide bead from a polyamic acid droplet by way of a polyamic acid bead stage. As can be understood from the foregoing discussion, one of the challenges to fabricating compressible beads suitable for the intended application (e.g. highly impermeable, high tensile strength, high compressibility, cyclic strain tolerance, etc.) is forming a polyimide bead having a substantially uniform shell in a desired configuration (i.e., shape, thickness, etc.). The methods described above utilize controlled non-solvent extraction methods and controlled, partial chemical imidization methods with varying operational parameters to obtain polyamic acid beads and polyimide beads having the desired structural and mechanical properties. As noted above, the methods 1000 include forming a droplet of polyamic acid at 1004, which droplet may be an actual droplet of polyamic acid solution, as described above, or may be a substantially spherical object having a coating of polyamic acid solution. The present section described various exemplary methods of coating the surface of an object with polyamic acid solution to obtain a compressible polyimide bead having a substantially uniform exterior shell.

Polyamic acid solution may be coated onto droplets in a variety of manners, some of which are described here and others of which will be apparent from a reading of the present application. In a first, non-limiting example, a suspension of a first component in oil may form many, miniature suspended droplets in the oil. For example, toluene may be mixed into a high viscosity silicone oil in a 1:5 volumetric ratio, suspending the toluene in the oil. A 10% concentration of polyamic acid in NMP may be added to the toluene-in-oil suspension. The polyamic acid solution coats the outside of the toluene droplets. The polyamic acid coated droplets may be filtered from the oil-suspension and imidized in any suitable manner, such as those described above. In an exemplary implementation, a chemical imidization agent, such as described above, may be added to the toluene-oil-polyamic acid mixture. For example, an equimolar mixture of DABCO and acetic anhydride in NMP (75% NMP by volume) may be prepared and added to the toluene-oil-polyamic acid mixture. The chemical imidization agent contacts the polyamic acid solution and begins to imidize the shell or coating on the toluene droplets. The resulting beads are then separated from the oil to provide a polyamic acid bead encasing or enveloping a toluene (or other composition) droplet.

The concentration of the polyamic acid and the selection of the aprotic solvent is exemplary and others may be used. Exemplary aprotic solvents were described above. The polyamic acid solution may be added to the toluene-in-oil suspension in a 1:5 volume ratio. The ratio of toluene to oil and of polyamic acid solution to toluene-in-oil suspension may vary. For example, either of those ratios may range from about 1:3 to about 1:10. Viscosity, mobility of the components, solubility of the components and other factors may affect the selection of volumetric ratios. Moreover, it may be understood that the ratio of polyamic acid solution to toluene may determine the thickness of the polyamic acid coating.

As described above, the polyamic acid coated droplet may be separated from the oil for further processing. Adding the chemical imidization agent to the oil mixture to partially imidize the polyamic acid coating may provide the coating with a degree of structural integrity tolerant to manipulation, such as during the separation from the oil. As described above, the degree of chemical imidization is dependent on the concentration of the imidization agent, the nature of the imidization agent, and the duration of the contact between the imidization agent and the polyamic acid. In some implementations, it may be preferred to allow the chemical imidization to proceed to complete imidization in the oil mixture so that the separation produces the final compressible imidized beads. Additionally or alternatively, the methods may include additional processing steps between the separation from the oil mixture and the complete imidization. For example, as described above, it may be desired to pressurize the beads during the imidization process, such as by thermally imidizing in an autoclave by increasing temperatures and pressures. In such instances, the partial chemical imidization may be allowed to proceed to a point where the shell has sufficient structural integrity for manipulation and processing and still sufficient permeability to allow the pressurizing gas to pass through the partially imidized shell.

Toluene was used above as an exemplary droplet in the oil. Other materials may be used that would form similar droplets in oil and that would be suitable for the process described here. The particular component added to oil and that becomes the substrate for the polyamic acid coating may be selected for its functional properties relative to the desired compressible polyimide beads. For example, the substrate component may be selected for its volatility at low temperatures. In examples where the partially imidized bead is separated from the oil mixture, the substrate material may be evaporated through heating and allowed to permeate through the partially imidized shell or coating. The description above of a drying stage adapted to evaporate a blowing agent may be analogous.

As yet another illustrative example of surface coating systems and methods, hollow polyimide beads can be made by bubbling a gas or solvent through a layered liquid bath. The layered liquid bath includes a first layer of polyamic acid in NMP and a second layer comprises a chemical imidization agent, such as DABCO and acetic anhydride or the other chemical imidization agents described above. The first and second layers of the liquid bath may be separated from each other in the bath in a variety of manners to prevent chemical imidization of the polyamic acid while in the liquid bath. For example, a thin membrane or other structural member may be disposed between the layers. Additionally or alternatively, a layer of an inert liquid, such as silicone oil, may be disposed between the first and second layers. Bubbles of a gas or solvent may then be injected into the bottom of the bath. As the bubble rises through the polyamic acid, the polyamic acid coats the bubble. The bubble then rises through the chemical imidizing agent and is coated by the imidizing agent. The chemical imidizing agent at least partially imidizes the polyamic acid coating, which can be separated from the layered liquid bath for subsequent processing. As with the description above, the partially imidized polyamic acid coating or shell may be pressurized and thermally imidized in an autoclave or other heating and pressurization system. Additionally or alternatively, the subsequent processing (e.g., after separation from the liquid bath and before complete imidization) may remove or modify the gas or solvent that provided the substrate for the polyamic acid coating. For example, the solvent may be evaporated through the partially imidized shell or the gas may be allowed to permeate through the partially imidized shell. The partially imidized, polyamic acid coated bubble is analogous to the partially imidized bead described above in connection with the chemical imidization systems and methods and may proceed to complete imidization in much the same manner.

In still another example of surface coating technologies, conventional Wurster coating technologies may be applied or adapted for use in fabricating compressible polyimide beads. Wurster coating technology can be summarized as having three primary steps: 1) particles to be coated (substrate) are fluidized in a hot atmosphere of a coating chamber, which is adapted to maintain the particles in fluidized motion; 2) the coating material is sprayed through nozzles onto the fluidized particles and film formation is initiated; and 3) the coated particles follow a succession of wetting and drying stages as needed. The Wurster coating technology may be applied to form a shell of polyamic acid solution that is analogous to the polyamic acid droplets described above. The resulting polyamic acid droplet may then be processed through non-solvent extraction or chemical imidization as discussed above.

In one exemplary implementation, the polyamic acid solution may be the coating material sprayed on a gas or solvent substrate. The polyamic acid solution may comprise polyamic acid and an aprotic solvent, in any of the manners discussed above. The Wurster coating technology may be adapted to progress the coated particles or substrate through successive coating and extraction stages where a first layer is coated on the substrate and then the aprotic solvent of the polyamic acid solution may be extracted, such as by flowing through a gaseous, non-solvent environment as described above. The polyamic acid coated substrate may then progress through subsequent coating and extraction stages until a polyamic acid coating of desired thickness and uniformity is formed. Having passed through extraction stages during the Wurster coating process, the resulting polyamic acid coating substrate may be analogous to the polyamic acid bead produced by the non-solvent extraction methods described above and may progress through imidization and pressurization as described above. Additionally or alternatively, as with the above descriptions of coated substrates, the coated substrate may be processed to modify or remove the substrate. For example, the substrate may be selected to be evaporated through heating and to permeate through the polyamic acid coating before complete imidization.

While Wurster coating technology may be applied to coat polyamic acid solution on a substrate, it may also be applied to coat a material on the surface of a formed polyamic acid bead (as from any of the examples and method above) or on a resulting polyimide bead. For example, it may be desirable to apply a surface coating on the polyimide bead to further enhance one or more properties of the polyimide bead. Protective coatings of inert materials may be one example of a surface coating material that could be applied to protect the polyimide bead from contact with other downhole compositions that may react with the polyimide. As the Wurster coating technology can apply a uniform coating of controlled thickness, such protective surface coatings can be customized for the particular circumstances. Additionally or alternatively, the Wurster coating technology can be applied to increase the exterior wall thickness of a polyamic acid bead. As described above, polyamic acid beads formed through non-solvent extraction methods with particular non-solvents can result in a foamed interior with a very thin exterior wall. The thin wall may not provide sufficient impermeable or other mechanical properties. The Wurster coating technology could then be applied to provide a thicker uniform exterior wall on the foamed interior.

EXAMPLES

Without limiting the generality of the foregoing discussion, the following numbered paragraphs, or the claims of the present application, the following examples are provided to illustrate exemplary details of various implementations that have been conducted based on the principles discussed above.

Example 1

Various sample supplies of polyamic acid solutions were prepared from which polyamic acid droplets were prepared using apparatus similar to those of FIGS. 5 and 6 above. Exemplary compositions and fabrication methods are described in this Example 1 to illustrate the effects of varying several of the parameters described above. For example, the fabrication methods described above incorporates a range of suitable values for parameters such as polyamic solution flow rate, droplet forming instrument configuration, non-solvent bath configuration, air gap configuration, etc.

In this Example 1, polyamic acid solutions pumped through different fabrication systems (following the template of FIGS. 12 and 13). The polyamic acid solutions were prepared from Upilex-S varnish. The polyamic acid solutions used in this Example 1 were 20 wt. % Upilex-S varnish in 1-methyl-2-pyrrolidinone (NMP). The varnish comprises the monomers 3,3',4,4'-biphenyltetracarboxylic dianhydride and 1,4-phenylenediamine and may be obtained from UBE Industries, LTD, Tokyo, Japan. In each of these implementations, the polyamic acid solution was passed through a slanted needle, or syringe needle, to form a droplet of polyamic acid solution. The slanted needle was 27 gauge and beveled. The droplets were allowed to fall varying heights into a non-solvent bath and allowed to soak in the non-solvent bath or in multiple baths for varying times to produce a polyamic acid bead of Upilex-S. The beads were then dried at room temperature in a vacuum oven. The variations and resulting polyamic acid bead morphology is shown in Table 1.

TABLE 1

| Sample Number | Pump Rate (ml/min; drop/min) | Air Gap (needle tip to top of non-solvent bath) | Pump Pressure | Non-solvent Bath Composition and Soak Times | Morphology Description |
|---|---|---|---|---|---|
| 1 | 0.5 ml/min; 15-20 drops/min | 1.77 m | 198-200 PSI | Water, <30 min | Egg-shaped, foamed interior |
| 2 | 0.5 ml/min; 15-20 drops/min | 1.77 m | 198-200 PSI | Water, <30 min Acetone, 20 min | Egg-shaped, foamed interior; foam cells more open than in Sample 1 |
| 3 | 0.2 ml/min; 10-12 drops/min | 1.77 m | 91-122 PSI | Water, 85 min Acetone, 78 min | Egg-shaped, foamed interior; foam cells more closed than in Sample 1 |
| 4 | 0.2 ml/min; 10-12 drops/min | 2 m | 140-166 PSI | Water, 110 min Acetone, 945 min | Flattened egg-shaped, foamed interior; foam cells more closed than in Sample 3 |

Example 2

In this set of experiments, the concentration of Upilex-S in the polyamic acid solution was varied together with the needle gauge, with the other factors held constant. Table 2 illustrates the state of each variable for the various samples. In summary, 10-20 wt % Upilex-S solutions were obtained by diluting the Upilex-S varnish received from Ube Industries with NMP. The various samples of Upilex-S solutions are identified by sample number in Table 2. Each sample was passed through a syringe needle of a specific size, shown in Table 2, to form a droplet of Upilex-S, or a polyamic acid droplet in the language of the above description. The droplets were placed in acetone to extract the NMP and to leave a polyamic acid bead of Upilex-S. The diluted Upilex-S solutions flattened into pancake shaped particles on impact with the acetone. The size of the beads depended on the size of the needle. The polyamic acid beads produced in these tests were brittle.

TABLE 2

| Sample No. | Wt % of Upilex-S | Needle Gauge |
|---|---|---|
| 24529-177-1 | 10 | 25 |
| 24529-177-2 | 15 | 25 |
| 24529-177-3 | 20 | Dropper |
| 24529-177-4 | 20 | 25 |
| 24529-177-5 | 20 | 18 |

The properties of the polyamic acid beads formed in this example were studied through various means. For the purposes of this Example, the beads were frozen in liquid nitrogen and then a portion of the bead was broken off by gentle impact with a hammer. Microscopy was used to study the morphology of the beads and the foamed interior. The beads formed from the samples in Table 2 produced a foamed interior having both open and closed cells. Some of bubbles or cells were connected through channels. The internal foam bubbles ranged from about 23 micrometers to about 52 micrometers and the internal bubble walls had varying thicknesses, but averaged at about 0.1 micrometers.

The beads obtained in this Example had solid external walls. However, just inside the external wall (e.g., about 3 micrometers from the outer surface), the foamed interior began. In the region closest to the external wall, the air filled cells or bubbles were small and more elliptical- or rod-like in shape than the bubbles in the center of the bead. For example, the outermost foam bubbles were between about 0.1 micrometers and about 3 micrometers in diameter. These smaller foam bubbles on the exterior made for a higher density outer wall or exterior wall. While the outermost, solid edge of the beads were about 0.1 micrometers in thickness, the dense, smaller foam bubbles created a higher density exterior wall having a thickness of about 3 micrometers.

The polyamic acid beads produced from the samples in Table 2 were then cured or imidized following a curing protocol recommended by the polyamic acid supplier. Specifically, the beads were cured in air according to the following protocol: 8 minute heating ramp from room temperature to 120° C.; hold for 60 minutes at 120° C.; 3 minute heating ramp to 150° C.; hold for 30 minutes at 150° C.; 3 minute heating ramp to 200° C.; hold for 10 minutes at 200° C.; 5 minute heating ramp to 250° C.; hold for 10 minutes at 250° C.; 20 minute heating ramp to 450° C.; hold for 10 minutes at 450° C.; and then 78 minute cooling ramp to 18° C. A broad range of alternative curing protocols can be used in this invention. Other than a minor color change to some portions of some of the beads, the morphology of the beads, internally and externally, appeared unchanged.

Example 3

As illustrated in Example 1, the differing non-solvent bath compositions and soak times in each of the baths had an impact on the morphology of the polyamic acid bead. Example 3 explored the suitability of various options for extracting the aprotic solvent from the polyamic acid droplet. Specifically, various potential bath fluids were studied to determine whether they were solvents for the aprotic solvent and/or for the polyamic acid. In this Example, the aprotic solvent was NMP and both the exemplary polyamic acids (Upilex-S and Upilex-R) were tested. Accordingly, the NMP needed to be extracted from the droplet into the bath fluid without extracting the polyamic acid. The relative degree of difference in solubility is expected to affect the rate of NMP extraction and the properties of the bead formed by the extraction. In Table 3, the solubility of the droplet components, in the form of 20 wt % polyamic acid in NMP, in the various bath compositions is indicated as being insoluble (IS), slightly soluble (SS), and soluble (S). The relative solubility of the polyamic acids was tested to prove the concept that the NMP could be extracted while leaving the polyamic acid in bead form, which is supported by the data in Table 3.

TABLE 3

| Bath composition/Droplet Component | Upilex S | Upilex-R | NMP |
|---|---|---|---|
| Methanol | IS | IS | S |
| Ethanol (200 proof anhydrous) | IS | IS | S |
| Acetone | IS | SS | S |

Example 4

In this Example 4, additional non-solvent solutions were used to evaluate the impact of the non-solvent solution on the bead morphology. Specifically, higher order ketones were used on the non-solvent solution bath rather than acetone as in the Examples above. In the sample runs of Example 4, the polyamic acid droplets were dropped into a non-solvent solution bath of 2-Butanone or into a non-solvent solution bath of 2-Hexanone. The droplets were formed of 20 wt % Upilex-S in NMP using a 25 gauge needle. The polyamic acid beads formed using the non-solvents 2-butanone and 2-hexanone measured between about 1.0 and about 2.0 mm in diameter. The resulting polyamic acid beads were hollow in the middle rather than having a foamed center region. As discussed above, the use of a higher molecular weight non-solvent provides greater control over the extraction rate, allowing the NMP to be extracted at a controlled rate depositing and concentrating the polyamic acid in the outermost regions leaving a hollow center.

Example 5

Chemical imidization agents were used to partially imidize polyamic acid droplets and form polyamic acid beads as described above. A 16 vol % polyamic acid solution (Upilex-S and NMP) was prepared and used to form the droplets. Two chemical imidization baths were prepared. The first chemical imidization bath comprised a 1:1 molar ratio of acetic anhydride:DABCO in NMP (75 vol % NMP). The second imidization bath comprised a similar composition but substituting valeric anhydride for the acetic anhydride. The polyamic acid droplets of a first experimentation set were allowed to remain in the first chemical imidization bath for 2 minutes and those of a second experimentation set were allowed to remain the second chemical imidization bath for 3 minutes. The partially imidized beads from each experimentation set were then strained from the respective imidization baths and rinsed with NMP. The partially imidized beads were then placed in a vacuum at 55° C. for 3 hours. After 3 hours in the vacuum, it was observed that all of the beads were slightly tacky but easily separable from each other. Moreover, the shells of the partially imidized beads were soft, but firm. For example, the shells were observed to deform slightly during sectioning.

Example 6

In an extension of Example 5, polyamic acid beads produced in the acetic anhydride:DABCO imidization bath were then subjected to an exchange bath. The exchange bath comprised 15 vol % NMP in water. The polyamic acid beads were placed in the exchange bath, which was then placed in a warm water bath at 90° C. The polyamic acid beads were held at about 90° C. for about 15 minutes, then removed from the heated water bath and allowed to cool to room temperature in the exchange bath. The total time in the exchange bath was about 3 hours. Some of the beads were then placed in a flowing nitrogen column at 55° C. to dry; others were placed in a nitrogen filled container at room temperature and allowed to dry overnight. The beads produced in both the flowing nitrogen column and the nitrogen filled container were round and hollow, having an outer surface soft enough to leave a knife mark before cutting the sample. However, it was also observed that the outer shell was firm enough to cut the beads cleanly.

Example 7

In yet another example of chemical imidization technique, a triaxial nozzle was used to produce a polyamic acid droplet having a perflourohexane non-solvent in the core. The polyamic acid solution was obtained as a varnish of 20 wt % Upilex-S in NMP having a viscosity of 2113 poise. The varnish was diluted to 10 wt % concentration with additional NMP solvent. The polyamic acid solution was held at room temperature and pumped through the triaxial nozzle at a flow rate of 0.05 cc/minute. Polyamic acid droplets were formed at a rate of 2.7 seconds per droplet. A collection of ten polyamic acid droplets weighed 0.0577 grams. The polyamic acid droplets traveled 15 cm from the tip of the triaxial nozzle to the chemical imidization bath, which was also held at room temperature. The chemical imidization bath comprised 25 wt % imidization agent in NMP. The imidization agent was a 1:1 molar ratio of acetic anhydride and DABCO. Ten polyamic acid droplets were collected and allowed to soak for about 120 seconds before being strained, rinsed in a hot water bath at 90° C. for 30 seconds and placed in a 50° C. vacuum oven for 2.5 hours. The resulting polyamic acid beads were soft but firm and cut cleanly.

While the present techniques of the invention may be susceptible to various modifications and alternative forms, the exemplary systems, methods, implementations, and embodiments discussed above have been shown by way of example. However, it should again be understood that the invention is not intended to be limited to the particular embodiments disclosed herein. Indeed, the present techniques of the invention are to cover all modifications, equivalents, and alternatives falling within the spirit and scope of the invention as defined by the following appended claims.

In the present disclosure, several of the illustrative, non-exclusive examples of methods and systems have been discussed and/or presented in the context of flow diagrams, or flow charts, in which the methods and/or systems are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities, other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" may mean A alone, B alone, C alone, A and B together, A and C together, B and C together, A, B and C together, and optionally any of the above in combination with at least one other entity.

Illustrative, non-exclusive examples of systems and methods according to the present disclosure are presented in the following numbered paragraphs. It is within the scope of the present disclosure that the individual steps of the methods recited herein, including in the following numbered paragraphs, may additionally or alternatively be referred to as a "step for" performing the recited action.

1. A method of fabricating a compressible polyimide bead, the method comprising: obtaining a solution of polyamic acid in an aprotic solvent; forming a droplet of the polyamic acid solution; extracting at least some of the aprotic solvent from the droplet under controlled conditions utilizing a non-solvent solution to form a bead having an exterior wall enveloping an interior region of polyamic acid solution; and thermally imidizing the bead to form a compressible polyimide bead having a high-density, imidized exterior wall and a low-density interior region, wherein polyamic acid in the interior region is imidized.

2. The method of paragraph 1, wherein the polyamic acid solution is selected from BPDA-ODA, BPDA-PDA, and mixtures thereof; and wherein the aprotic solvent is selected from NMP, DMAC, DMF, DMSO, THF, and mixtures thereof.

3. The method of paragraph 2 wherein the polyamic acid solution comprises greater than about 5 wt % polyamic acid and less than about 20 wt % polyamic acid.

4. The method of paragraph 1 wherein the droplet of polyamic acid solution passes through an air gap before entering the non-solvent solution.

5. The method of paragraph 1 wherein forming a droplet of the polyamic solution comprises passing the polyamic acid solution through a nozzle to form a polyamic acid solution stream at a polyamic acid solution flow rate while passing a gas around the nozzle at a gas flow rate; wherein the gas flow rate and the polyamic acid flow rate are controlled to shear the polyamic acid solution stream into droplets of substantially uniform configuration.

6. The method of paragraph 5 wherein forming a droplet of the polyamic acid solution incorporates a substantially centralized core material into the droplet.

7. The method of paragraph 5 wherein forming a droplet produces droplets having an effective diameter of greater than about 500 microns and less than about 3000 microns.

8. The method of paragraph 1 wherein the non-solvent solution comprises at least one of ketones and alcohols.

9. The method of paragraph 8 wherein the non-solvent solution comprises at least one of acetone, 2-butanone, 2-hexanone, 2-octanone, methanol, ethanol, and mixtures thereof.

10. The method of paragraph 8 wherein the bead has a residence time in the non-solvent solution based at least in part on the selection of the non-solvent solution.

11. The method of paragraph 8 wherein the bead has a residence time adapted to form an exterior wall having a thickness between about 25 microns and about 100 microns.

12. The method of paragraph 11 wherein the residence time is adapted to form an exterior wall having a thickness selected to provide the compressible polyimide bead with a diameter-to-thickness ratio between about 20 and about 50.

13. The method of paragraph 1, further comprising drying the bead at a temperature below the boiling point of the aprotic solvent to remove additional aprotic solvent from the bead.

14. The method of paragraph 13 further comprising agitating the bead during the drying process to uniformly coat an interior of the exterior wall with polyamic acid as the aprotic solvent evaporates through the exterior wall.

15. The method of paragraph 14 wherein drying the bead continues for a drying time adapted to evaporate substantially all of the aprotic solvent from the exterior wall and from the interior region.

16. The method of paragraph 14 wherein a tumble dryer is used to agitate the bead.

17. The method of paragraph 1 further comprising pressurizing the bead prior to thermally imidizing the bead, wherein the bead is pressurized to an internal pressure between about 500 psi and about 5000 psi.

18. The method of paragraph 17 wherein pressurizing the bead and thermally imidizing the bead occur in an autoclave.

19. The method of paragraph 1 wherein the low-density interior region is hollow.

20. The method of paragraph 1 wherein the extraction of at least some aprotic solvent from the droplet occurs under conditions adapted to slow the rate of extraction and to densify the polyamic acid chains in the exterior wall.

21. A compressible polyimide bead having a high-density, imidized exterior wall and a low-density interior region made through the methods of paragraph 1.

22. The polyimide bead of paragraph 21 wherein the interior region is adapted to be pressurized to an internal pressure greater than about 500 psi and less than about 5000 psi, and wherein the exterior wall of the bead is adapted to maintain the internal pressure within about 10% of an initial internal pressure for greater than 24 hours.

23. The polyimide bead of paragraph 22 wherein the exterior wall is adapted to maintain the internal pressure within about 5% of the initial internal pressure for greater than 72 hours.

24. The polyimide bead of paragraph 21 wherein the interior region is at least substantially hollow.

25. A method of fabricating a compressible polyimide bead, the method comprising: obtaining a solution of polyamic acid in an aprotic solvent; forming a droplet of the polyamic acid solution; extracting at least some of the aprotic solvent from the droplet under controlled conditions utilizing a non-solvent solution comprising at least one of acetone, 2-butanone, 2-hexanone, 2-octanone, methanol, and ethanol to form a bead having an exterior wall enveloping an interior region of polyamic acid solution; thermally imidizing the bead to form a compressible polyimide bead having a high-density, imidized exterior wall and a low-density interior region, wherein polyamic acid in the interior region is imidized.

26. The method of paragraph 25, wherein the polyamic acid solution is selected from BPDA-ODA, BPDA-PDA, and mixtures thereof; and wherein the aprotic solvent is selected from NMP, DMAC, DMF, DMSO, THF, and mixtures thereof.

27. The method of paragraph 26 wherein the polyamic acid solution comprises greater than about 5 wt % polyamic acid and less than about 20 wt % polyamic acid.

28. The method of paragraph 25 wherein the droplet of polyamic acid solution passes through an air gap before entering the non-solvent solution.

29. The method of paragraph 25 wherein forming a droplet of the polyamic solution comprises passing the polyamic acid solution through a nozzle to form a polyamic acid solution stream at a polyamic acid solution flow rate while passing a gas around the nozzle at a gas flow rate; wherein the gas flow rate and the polyamic acid flow rate are controlled to shear the polyamic acid solution stream into droplets of substantially uniform configuration.

30. The method of paragraph 29 wherein forming a droplet of the polyamic acid solution incorporates a substantially centralized core material into the droplet.

31. The method of paragraph 29 wherein forming a droplet produces droplets having an effective diameter of greater than about 500 microns and less than about 3000 microns.

32. The method of paragraph 25 wherein the bead has a residence time in the non-solvent solution based at least in part on the selection of the non-solvent solution.

33. The method of paragraph 32 wherein the bead has a residence time adapted to form an exterior wall having a thickness between about 25 microns and about 100 microns.

34. The method of paragraph 32 wherein the residence time is adapted to form an exterior wall having a thickness selected to provide the compressible polyimide bead with a diameter-to-thickness ratio between about 20 and about 50.

35. The method of paragraph 25, further comprising drying the bead at a temperature below the boiling point of the aprotic solvent to remove additional aprotic solvent from the bead.

36. The method of paragraph 35 further comprising agitating the bead during the drying process to uniformly coat an interior of the exterior wall with polyamic acid as the aprotic solvent evaporates through the exterior wall.

37. The method of paragraph 36 wherein drying the bead continues for a drying time adapted to evaporate substantially all of the aprotic solvent from the exterior wall and from the interior region.

38. The method of paragraph 36 wherein a tumble dryer is used to agitate the bead.

39. The method of paragraph 25 further comprising pressurizing the bead prior to thermally imidizing the bead, wherein the bead is pressurized to an internal pressure between about 500 psi and about 5000 psi.

40 The method of paragraph 39 wherein pressurizing the bead and thermally imidizing the bead occur in an autoclave.

41. The method of paragraph 25 wherein the low-density interior region is hollow.

42. The method of paragraph 25 wherein the extraction of at least some aprotic solvent from the droplet occurs under conditions adapted to slow the rate of extraction and to densify the polyamic acid chains in the exterior wall.

43. A system for fabricating compressible polyimide beads, the system comprising: a polyamic acid solution supply comprising a solution of polyamic acid in an aprotic solvent; polyamic acid droplet forming equipment adapted to form substantially uniform polyamic acid droplets from the polyamic acid solution at a controlled rate; a non-solvent solution bath adapted to receive polyamic acid droplets and to extract aprotic solvent from the droplet under controlled conditions to form a polyamic acid bead having an exterior wall enveloping an interior region of polyamic acid solution; heating equipment adapted to thermally imidize the polyamic acid bead to form a compressible polyimide bead having a high-density, imidized exterior wall and a low-density interior region, wherein polyamic acid in the interior region is imidized.

44. A method of fabricating a compressible polyimide bead, the method comprising: obtaining a solution of polyamic acid in an aprotic solvent; forming a droplet of the polyamic acid solution; chemically imidizing the droplet in a chemical imidization bath comprising an imidizing agent to form a partially imidized bead having an exterior wall enveloping an interior region of polyamic acid solution; quenching the chemical imidization reaction by removing at least substantially all of the imidizing agent from the bead; drying the bead at a temperature below the boiling point of the aprotic solvent to remove at least some aprotic solvent from the bead; and thermally imidizing the beads to complete the imidization to form a compressible polyimide bead having a high-density, imidized exterior wall and a low-density interior region, wherein polyamic acid in the interior region is imidized.

45. The method of paragraph 44, wherein the polyamic acid solution is selected from BPDA-ODA, BPDA-PDA, and mixtures thereof; and wherein the aprotic solvent is selected from NMP, DMAC, DMF, DMSO, THF, and mixtures thereof.

46. The method of paragraph 45 wherein the polyamic acid solution comprises greater than about 5 wt % polyamic acid and less than about 20 wt % polyamic acid.

47. The method of paragraph 44 wherein the droplet of polyamic acid solution passes through an air gap before entering the non-solvent solution.

48. The method of paragraph 44 wherein forming a droplet of the polyamic solution comprises passing the polyamic acid solution through a nozzle to form a polyamic acid solution stream at a polyamic acid solution flow rate while passing a gas around the nozzle at a gas flow rate; wherein the gas flow rate and the polyamic acid flow rate are controlled to shear the polyamic acid solution stream into droplets of substantially uniform configuration.

49. The method of paragraph 48 wherein forming a droplet of the polyamic acid solution incorporates a substantially centralized core material into the droplet.

50. The method of paragraph 48 wherein forming a droplet produces droplets having an effective diameter of greater than about 500 microns and less than about 3000 microns.

51. The method of paragraph 44 wherein the imidization agent in the imidization bath comprises an anhydride and a basic amine; and wherein the imidization bath further includes an aprotic solvent.

52. The method of paragraph 51 wherein the anhydride and the basic amine are in solution in the imidization bath at a stoichiometric ratio of about 1:1; and wherein the anhydride is selected from acetic anhydride and alkylated acetic anhydrides; and wherein the basic amine is selected from DABCO, pyridine, and triethylamine.

53. The method of paragraph 51 wherein the aprotic solvent is selected from NMP, DMAC, DMF, DMSO, THF, and mixtures thereof.

54. The method of paragraph 44, wherein quenching utilizes a non-solvent solution including at least one non-solvent for the polyamic acid; and wherein drying is to remove residual aprotic solvent and at least some of the non-solvent.

55. The method of paragraph 54 wherein the non-solvent is selected from aqueous solutions, ketones, alcohols, and mixtures thereof.

56. The method of paragraph 54 wherein the non-solvent solution comprises at least one of acetone, 2-butanone, 2-hexanone, 2-octanone, methanol, ethanol, and butanol.

57. The method of paragraph 44, further comprising drying the bead at a temperature below the boiling point of the aprotic solvent to remove additional aprotic solvent from the bead.

58. The method of paragraph 57 further comprising agitating the bead during the drying process to uniformly coat an interior of the exterior wall with polyamic acid as the aprotic solvent evaporates through the exterior wall.

59. The method of paragraph 57 wherein drying the bead continues for a drying time adapted to evaporate substantially all of the aprotic solvent from the exterior wall and from the interior region.

60. The method of paragraph 44 further comprising pressurizing the bead prior to thermally imidizing the bead, wherein the bead is pressurized to an internal pressure between about 500 psi and about 5000 psi.

61. The method of paragraph 60 wherein pressurizing the bead and thermally imidizing the bead occur in an autoclave.

62. The method of paragraph 44 wherein the low-density interior region is hollow.

63. A compressible polyimide bead having a high-density, imidized exterior wall and a low-density interior region made through the methods of paragraph 1.

64. The polyimide bead of paragraph 63 wherein the interior region is adapted to be pressurized to an internal pressure greater than about 500 psi and less than about 5000 psi, and wherein the exterior wall of the bead is adapted to maintain the internal pressure within about 10 % of an initial internal pressure for greater than 24 hours.

65. The polyimide bead of paragraph 64 wherein the exterior wall is adapted to maintain the internal pressure within about 5 % of the initial internal pressure for greater than 72 hours.

66. The polyimide bead of paragraph 63 wherein the interior region is at least substantially hollow.

67. A system for fabricating compressible polyimide beads, the system comprising: a polyamic acid solution supply comprising a solution of polyamic acid in an aprotic solvent; polyamic acid droplet forming equipment adapted to form substantially uniform polyamic acid droplets from the polyamic acid solution at a controlled rate; a chemical imidization bath comprising an imidizing agent and adapted to receive polyamic acid droplets and to partially imidize an exterior shell of the polyamic acid droplets to form a polyamic acid bead having an exterior wall enveloping an interior region of polyamic acid solution; a quenching station adapted to remove at least substantially all of the imidizing agent from the polyamic acid bead; a dryer adapted to heat the polyamic acid bead to a temperature below a boiling point of the aprotic solvent and to remove at least some aprotic solvent from the bead; and heating equipment adapted to thermally imidize the polyamic acid bead to form a compressible polyimide bead having a high-density, imidized exterior wall and a low-density interior region, wherein polyamic acid in the interior region is imidized.

68. A method for fabricating compressible polyimide beads, the method comprising: obtaining a substantially spherical substrate; obtaining a solution of polyamic acid solution comprising a polyamic acid in an aprotic solvent; coating the substrate with the polyamic acid solution to form a polyamic acid droplet; processing the polyamic acid droplet to form an polyamic acid bead; thermally imidizing the polyamic acid bead to form a compressible polyimide bead having a high-density, imidized exterior wall and a low-density interior region, wherein polyamic acid in the interior region is imidized.

69. The method of paragraph 68 wherein the substrate is selected from gas bubbles and solvent bubbles introduced into the polyamic acid solution.

70. The method of paragraph 68 wherein the substrate is a volatile solvent that is adapted to permeate through an exterior shell of the polyamic acid bead.

71. The method of paragraph 68 wherein coating the substrate utilizes Wurster coating technologies.

72. The method of paragraph 68 wherein processing the polyamic acid droplet to form a polyamic acid bead comprises at least one of non-solvent extraction to concentrate the polyamic acid and partial chemical imidization.

Industrial Applicability

The systems and methods described herein are applicable to the oil and gas industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A method for fabricating compressible polyimide beads, the method comprising:
    obtaining a substantially spherical substrate;
    obtaining a solution of polyamic acid solution comprising a polyamic acid in an aprotic solvent;
    coating the substrate with the polyamic acid solution to form a polyamic acid droplet;
    processing the polyamic acid droplet to form an polyamic acid bead;
    thermally imidizing the polyamic acid bead to form a compressible polyimide bead having a high-density, imidized exterior wall and a low-density interior region, wherein polyamic acid in the interior region is imidized.

2. The method of claim 1 wherein the substrate is selected from gas bubbles and solvent bubbles introduced into the polyamic acid solution.

3. The method of claim 1 wherein the substrate is a volatile solvent that is adapted to permeate through an exterior shell of the polyamic acid bead.

4. The method of claim 1 wherein coating the substrate utilizes Wurster coating technologies.

5. The method of claim 1 wherein processing the polyamic acid droplet to form a polyamic acid bead comprises at least one of non-solvent extraction to concentrate the polyamic acid and partial chemical imidization.

* * * * *